US009736410B2

(12) United States Patent
Uchida

(10) Patent No.: US 9,736,410 B2
(45) Date of Patent: Aug. 15, 2017

(54) IMAGE PICKUP APPARATUS CAPABLE OF SELECTIVELY USING ONE OF CORRECTION VALUES TO CORRECT IMAGE SIGNALS, IMAGE PICKUP SYSTEM, SIGNAL PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Mineo Uchida, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 129 days.

(21) Appl. No.: 14/305,485

(22) Filed: Jun. 16, 2014

(65) Prior Publication Data

US 2014/0368696 A1 Dec. 18, 2014

(30) Foreign Application Priority Data

Jun. 18, 2013 (JP) .................................. 2013-127788

(51) Int. Cl.
*H04N 5/369* (2011.01)
*H04N 5/378* (2011.01)
(Continued)

(52) U.S. Cl.
CPC ......... *H04N 5/3696* (2013.01); *H04N 5/3651* (2013.01); *H04N 5/378* (2013.01); *H04N 5/23212* (2013.01)

(58) Field of Classification Search
CPC ............. H04N 5/23212; H04N 5/3572; H04N 5/3651; H04N 5/3696
See application file for complete search history.

(56) References Cited

U.S. PATENT DOCUMENTS

2006/0188149 A1* 8/2006 Chiang ................ H04N 19/186
382/162
2007/0146496 A1* 6/2007 Kitani .................... H04N 5/361
348/222.1
(Continued)

FOREIGN PATENT DOCUMENTS

| CN | 102710903 A | 10/2012 | |
|---|---|---|---|
| JP | 2001-124984 A | 5/2001 | |
| JP | WO 2013077154 A1 * | 5/2013 | ............. G03B 13/36 |

OTHER PUBLICATIONS

The above foreign patent document was cited in a Jan. 20, 2017 Chinese Office Action, which is enclosed with an English Translation, that issued in Chinese Patent Application No. 201410256200.3.

*Primary Examiner* — Dennis Hogue
(74) *Attorney, Agent, or Firm* — Cowan, Liebowitz & Latman, P.C.

(57) ABSTRACT

An image pickup apparatus includes an image pickup element including a plurality of pixels corresponding to a plurality of respective micro lenses and the first photoelectric conversion portion and the second photoelectric conversion portion that are included in each of the pixels and share a corresponding one of the micro lenses, and a signal processing unit configured to correct an addition signal of outputs from the first photoelectric conversion portion and the second photoelectric conversion portion included in each of the pixels and a first signal generated from a plurality of signals of the first photoelectric conversion portions corresponding to the micro lenses, and the signal processing unit corrects the addition signal for each of the pixels and corrects the first signal for the first photoelectric conversion portions.

18 Claims, 16 Drawing Sheets

(51) Int. Cl.
*H04N 5/365* (2011.01)
*H04N 5/232* (2006.01)

(56) References Cited

U.S. PATENT DOCUMENTS

| | | | |
|---|---|---|---|
| 2011/0019028 A1* | 1/2011 | Kimijima | G02B 7/34 348/222.1 |
| 2012/0273655 A1* | 11/2012 | Ise | H04N 5/3658 250/208.1 |
| 2013/0050529 A1* | 2/2013 | Murayama | H04N 5/3572 348/234 |

* cited by examiner

IMAGE PICKUP APPARATUS CAPABLE OF SELECTIVELY USING ONE OF CORRECTION VALUES TO CORRECT IMAGE SIGNALS, IMAGE PICKUP SYSTEM, SIGNAL PROCESSING METHOD, AND NON-TRANSITORY COMPUTER-READABLE STORAGE MEDIUM

BACKGROUND OF THE INVENTION

Field of the Invention

The present invention relates to an image pickup apparatus including an image pickup element, and more particularly relates to an image pickup apparatus including an image pickup element including a plurality of sub pixels for each pixel.

Description of the Related Art

A recent image pickup apparatus including an image pickup element such as a CMOS sensor has multi-functionality, and not only generates a shot image such as a still image or a moving image but also performs control, such as focusing, of the image pickup apparatus based on object information obtained by the image pickup element.

Japanese Patent Laid-open No. 2001-124984 discloses a configuration capable of performing focus detection by a pupil division method using a signal obtained from an image pickup element. Japanese Patent Laid-open No. 2001-124984 discloses a configuration in which one micro lens and two photodiodes are provided for each pixel of the image pickup element, the photodiodes being configured to receive lights passing through different pupil regions of a image pickup lens. Such a configuration allows focus detection by comparing output signals from the two photodiodes and generation of a shot image by adding the output signals from the two photodiodes.

The image pickup element such as a CMOS sensor needs corrections such as an offset correction and a gain correction for each pixel (or, for each pixel column, or for each pixel row) to remove fixed pattern noise caused by a signal readout circuit of the image pickup element.

However, in a case with a plurality of photodiodes provided for each pixel, as disclosed by Japanese Patent Laid-open No. 2001-124984, performing corrections for each photodiode results in an increased amount of correction data, which requires a large amount of memory.

SUMMARY OF THE INVENTION

The present invention provides an image pickup apparatus, an image pickup system, a signal processing method, and a storage medium that are capable of highly accurately generating both an image pickup signal and a focus detection signal from an image pickup element with a small amount of correction data.

An image pickup apparatus as one aspect of the present invention includes an image pickup element including a plurality of pixels corresponding to a plurality of respective micro lenses and a first photoelectric conversion portion and a second photoelectric conversion portion that are included in each of the pixels and share a corresponding one of the micro lenses, and a signal processing unit configured to correct an addition signal of outputs from the first photoelectric conversion portion and the second photoelectric conversion portion included in each of the pixels and a first signal generated from a plurality of signals of the plurality of first photoelectric conversion portions corresponding to the micro lenses, and the signal processing unit is configured to correct the addition signal for each of the pixels and correct the first signal for the first photoelectric conversion portions.

An image pickup system as another aspect of the present invention includes an image pickup apparatus and a lens apparatus detachably mounted to the image pickup apparatus.

A signal processing method as another aspect of the present invention is a method of performing processing on a signal obtained from an image pickup element including a plurality of pixels corresponding to a plurality of respective micro lenses and a first photoelectric conversion portion and second photoelectric conversion portion that are included in one of the pixels and share a corresponding one of the micro lenses, the method including the steps of acquiring an addition signal of outputs from the first photoelectric conversion portion and the second photoelectric conversion portion included in one of the pixels, acquiring a plurality of signals of a plurality of the first photoelectric conversion portions corresponding to the micro lenses, generating a first signal generated from the signals, and correcting the addition signal for each of the pixels and correcting the first signal for the first photoelectric conversion portions.

A non-transitory computer-readable storage medium as another aspect of the present invention is a non-transitory computer-readable storage medium that stores a program configured to cause a computer to execute the steps of the signal processing method.

Further features and aspects of the present invention will become apparent from the following description of exemplary embodiments with reference to the attached drawings.

DESCRIPTION OF THE EMBODIMENTS

Figure 1:
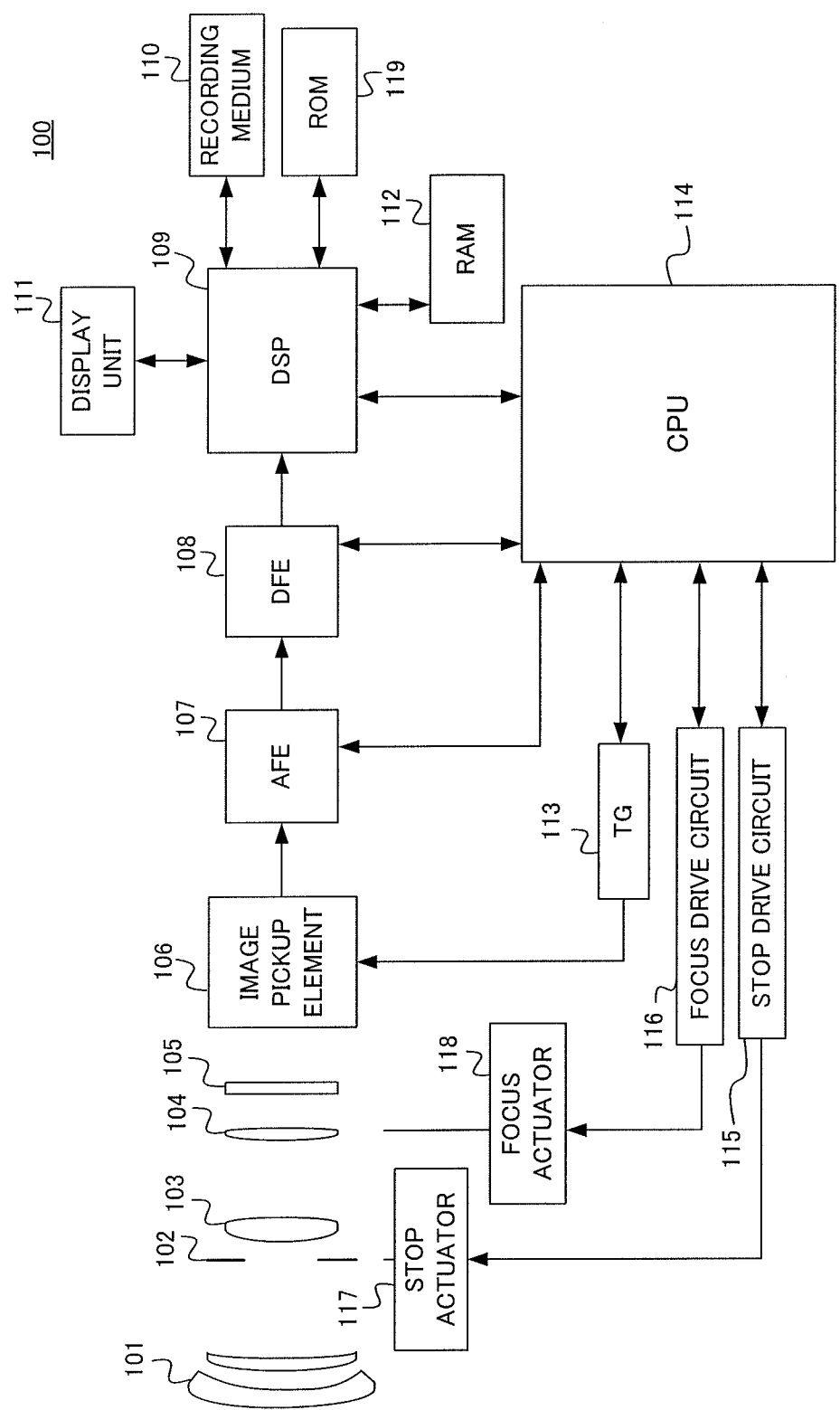
FIG. 1 is a block diagram of an image pickup apparatus in each of embodiments.

Exemplary embodiments of the present invention will be described below with reference to the accompanied drawings. In each of the drawings, the same elements will be denoted by the same reference numerals and the duplicate descriptions thereof will be omitted.

First, referring to FIG. 1, the configuration of an image pickup apparatus in each of the embodiments will be described. FIG. 1 is a block diagram of an image pickup apparatus 100 in each of the embodiments. Reference numeral 101 denotes a first lens unit disposed at a leading end of an imaging optical system and held movable forward and backward in an optical axis direction. Reference numeral 102 denotes a stop with its opening diameter adjusted to perform a light intensity adjustment at the time of shooting. Reference numerical 103 denotes a second lens unit that performs a magnification-varying operation (zoom function) cooperatively with the forward and backward operation of the first lens unit 101. Reference numeral 104 denotes a third lens unit that performs focusing by moving forward and backward in the optical axis direction. Reference numeral 105 denotes an optical lowpass filter as an optical element for reducing a false color or moire in a shot image.

In each of the embodiments, the lens units described above constitute an image pickup optical system. A lens apparatus including the image pickup optical system is integrally configured with the image pickup apparatus body, but each of the embodiments is not limited to this configuration. Each of the embodiments is applicable to an image pickup system including the image pickup apparatus body and a lens apparatus (image pickup optical system) detachably mounted on the image pickup apparatus body.

Reference numeral 106 denotes an image pickup element that performs a photoelectric conversion on an object image (optical image) formed by the image pickup optical system (the lens units described above). In each of the embodiments, the image pickup element 106 is a CMOS image sensor having the Bayer array. The image pickup element 106 outputs an analog image signal, which is then converted to a digital signal by an analog front end (AFE) 107. The digital image signal output from the AFE 107 is input to a digital front end (DFE) 108 to perform predetermined calculation processing. The DFE 108 together with a digital signal processor (DSP) 109 described below constitutes a signal processor (signal processing unit).

Reference numeral 109 denotes the DSP that performs correction processing, development processing, or the like on a digital image signal output from the DFE 108. The DSP 109 also performs an automatic focus (AF) calculation of the amount of focus shift from an image signal (digital image signal). Reference numeral 110 denotes a recording medium that records image data. Reference numeral 111 denotes a display unit that displays a shot image, various menu screens, or the like, and is a liquid crystal display (LCD), for example. Reference numeral 112 denotes a RAM that temporally stores image data or the like and is connected to the DSP 109. Reference numeral 113 denotes a timing generator (TG) that supplies a drive signal to the image pickup element 106.

Reference numeral 114 denotes a CPU that controls the AFE 107, the DFE 108, the DSP 109, the TG 113, and a stop drive circuit 115. The CPU 114 also controls a focus drive circuit 116 based on a result of the AF calculation by the DSP 109. Reference numeral 115 denotes the stop drive circuit that drives the stop 102 by controlling a stop actuator 117. Reference numeral 116 denotes the focus drive circuit that moves (drives) the third lens unit 104 forward and backward in the optical axis direction to perform focusing by controlling a focus actuator 118. Reference numeral 119 denotes a ROM that stores various kinds of correction data, for example.

Figure 2:
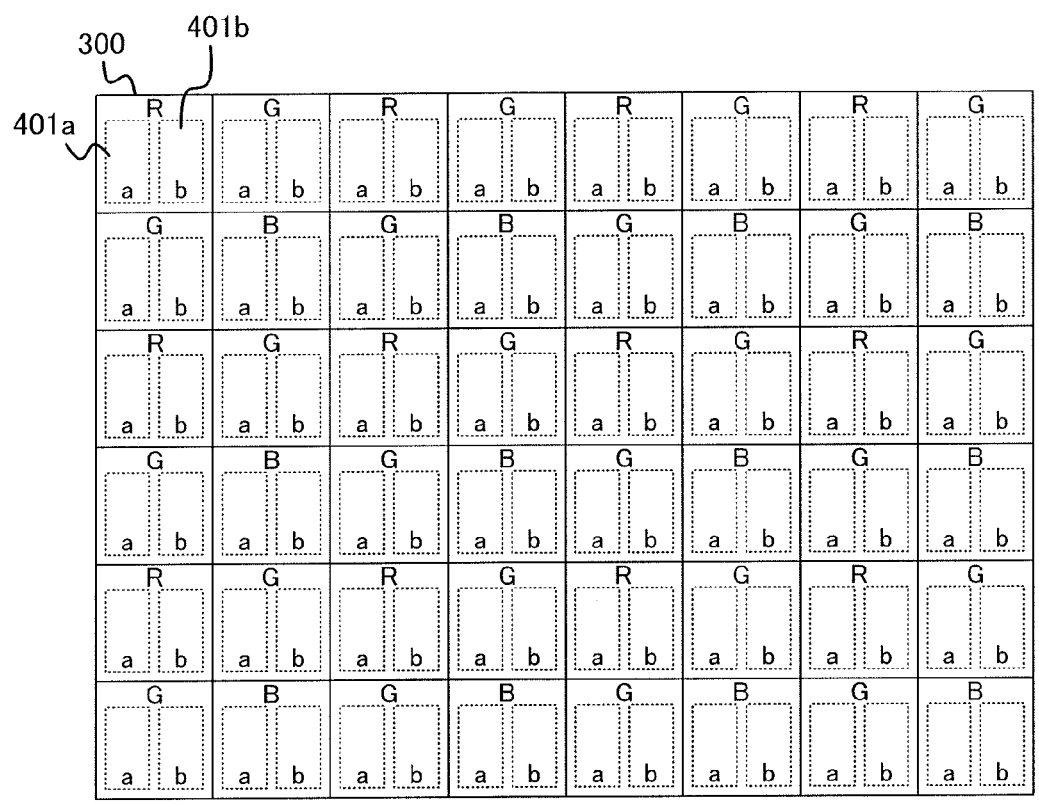
FIG. 2 is a pixel array diagram of an image pickup element in each of the embodiments.

Next, referring to FIG. 2, the pixel array of the image pickup element 106 in each of the embodiments will be described. FIG. 2 is a pixel array diagram of the image pickup element 106. As illustrated in FIG. 2, the image pickup element 106 includes a unit pixel 300 (one pixel) plurally arrayed in a matrix, each of the pixels including any of color filters of R (red), G (green), and B (blue) arrayed in the Bayer array. The unit pixels 300 each includes a sub pixel "a" (first photoelectric conversion portion) and a sub pixel "b" (second photoelectric conversion portion) arrayed. Reference numerals 401a and 401b in FIG. 2 denote photodiodes (hereinafter referred to as "PD") of the sub pixels "a" and "b", respectively. Output signals of the sub pixels "a" and "b" are each used in focus detection. The output signals of the sub pixels "a" and "b" are added together to give a signal (a/b addition signal) that is then used in image generation (generation of a shot image).

Figure 3:
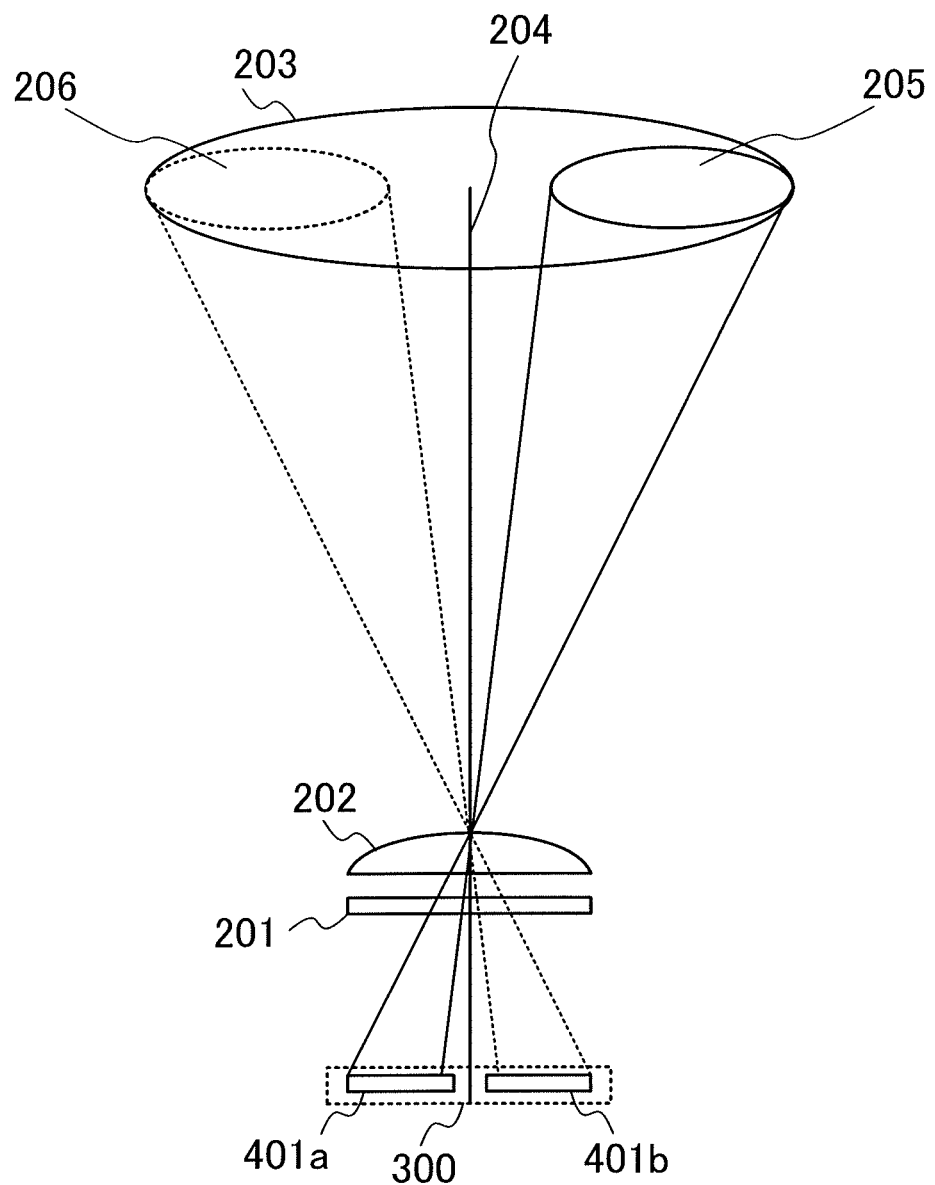
FIG. 3 is a schematic diagram illustrating the relation between a pixel and a light beam emitted from an exit pupil of an image pickup lens in each of the embodiments.

Next, referring to FIG. 3, the relation between a light beam emitted from an exit pupil of the image pickup optical system (image pickup lens) including the first lens unit 101, the stop 102, the second lens unit 103, and the third lens unit 104, and the unit pixel 300 of the image pickup element 106 will be described. FIG. 3 is a schematic diagram illustrating the relation between the light beam emitted from the exit pupil of the image pickup optical system (image pickup lens) and the unit pixel 300.

Reference numeral 201 denotes a color filter, and reference numeral 202 denotes a micro lens. The color filter 201 and the micro lens 202 are each formed on the unit pixel 300 (PDs 401a and 401b). Reference numeral 203 denotes the exit pupil of the image pickup optical system (image pickup lens). Reference numeral 204 denotes an optical axis indicating the center of the light beam emitted from the exit pupil 203 to a pixel (the unit pixel 300) including the micro lens 202. The light beam passing through the exit pupil 203 is incident on the unit pixel 300, centering on the optical axis 204.

Reference numerals 205 and 206 denote pupil regions (partial regions) different from each other in the exit pupil of the image pickup optical system (image pickup lens). As illustrated in FIG. 3, a light beam passing through the pupil region 205 is received by the sub pixel "a" through the micro lens 202. In contrast, a light beam passing through the pupil region 206 is received by the sub pixel "b" through the micro lens 202. As described above, the sub pixels "a" and "b" receive lights from the respective regions (mutually different regions) of the exit pupil of the image pickup lens. This allows focus detection by a phase difference method by comparing output signals of the sub pixel "a" and "b".

Figure 4A:
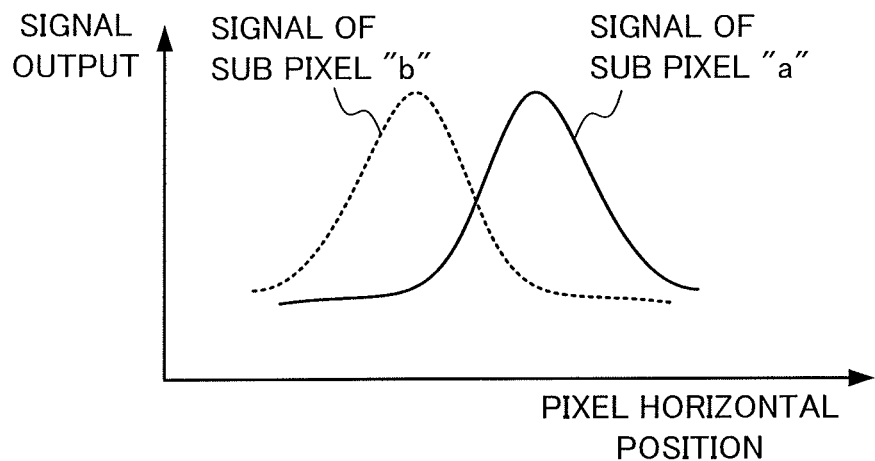
FIGS. 4A and 4B are schematic diagrams illustrating image signal waveforms obtained from sub pixels of the image pickup element in each of the embodiments.
Figure 4B:
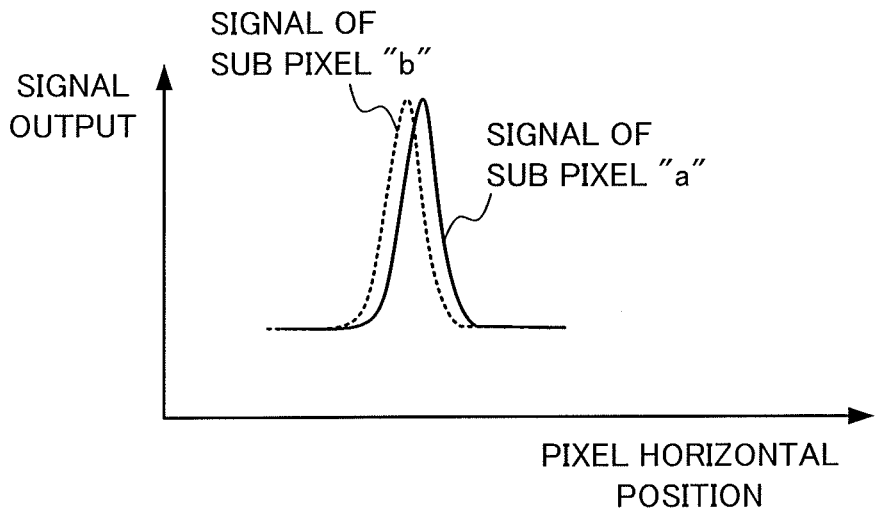

Next, referring to FIGS. 4A and 4B, image signal waveforms obtained from the sub pixels "a" and "b" of the image pickup element 106 will be described. FIGS. 4A and 4B are schematic diagrams of the image signal waveforms obtained from the sub pixels "a" and "b", where FIG. 4A illustrates the state of not being in an in-focus state (being in an out-of-focus state) and FIG. 4B illustrates the in-focus state (substantially in-focus state). In FIGS. 4A and 4B, the vertical axis represents the signal output and the horizontal axis represents the position (pixel horizontal position).

In the state of not being in the in-focus state (in the out-of-focus state) as illustrated in FIG. 4A, the image signal waveforms (the waveforms of signals of the sub pixel "a" and the sub pixel "b") obtained from the sub pixels "a" and "b" do not coincide and are largely shifted from each other. Closer to the in-focus state from the out-of-focus state, the image signal waveforms of the sub pixels "a" and "b" have a smaller amount of shift as illustrated in FIG. 4B. Then, in the in-focus state, the image signal waveforms overlap with each other. In this way, the amount of out-of-focus (the amount of defocus) is detected based on the shift (the amount of shift) of the image signal waveforms obtained from the sub pixels "a" and "b", thereby performing focusing.

Figure 5:
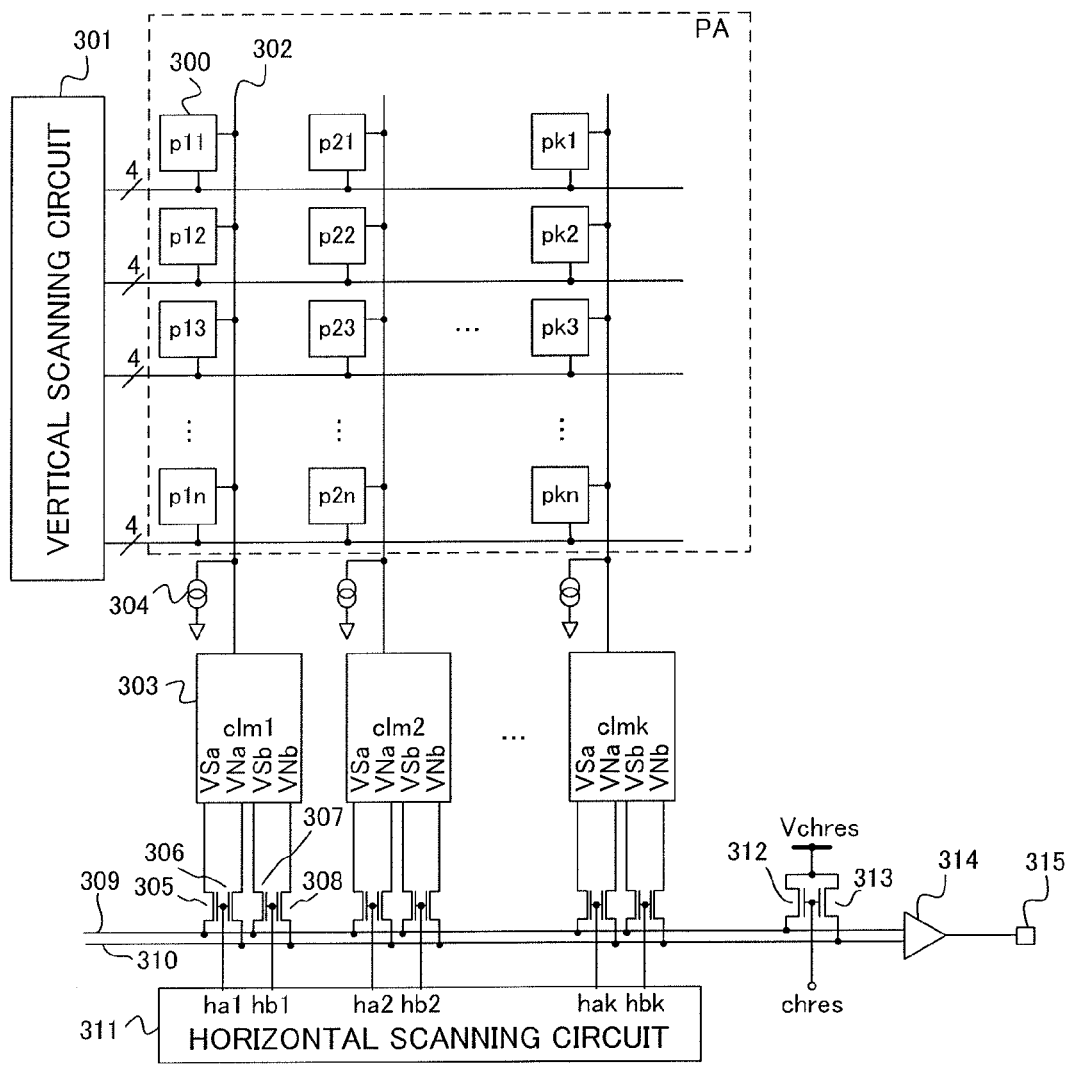
FIG. 5 is a whole configuration diagram of the image pickup element in each of the embodiments.

Next, referring to FIG. 5, the whole configuration of the image pickup element 106 will be described. FIG. 5 is a whole configuration diagram of the image pickup element 106. Symbol PA denotes a pixel area of the image pickup element 106. The pixel area PA includes the unit pixels 300 disposed in a two-dimensional arrangement (in a matrix) of p11 to pkn.

Figure 6:
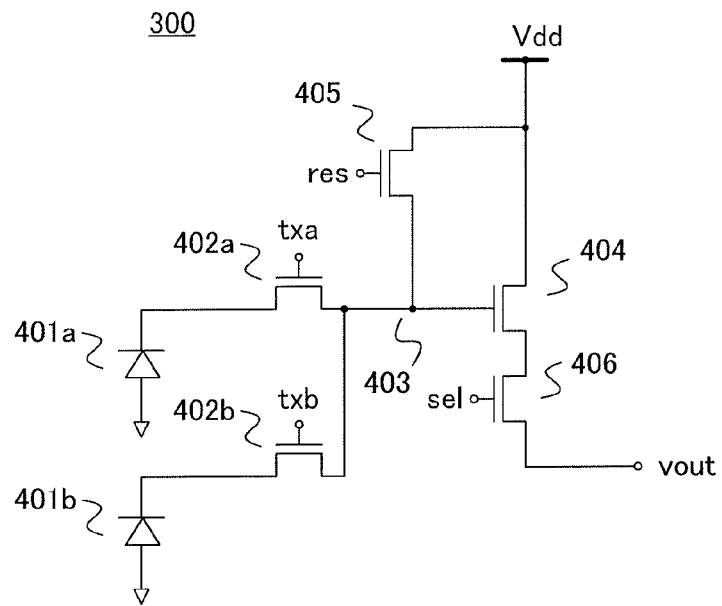
FIG. 6 is a circuit configuration diagram of a unit pixel (one pixel) of the image pickup element in each of the embodiments.

Next, referring to FIG. 6, a circuit configuration of the unit pixel 300 (one pixel) will be described. FIG. 6 is a circuit configuration diagram of the unit pixel 300. The PDs 401a and 401b of the sub pixels "a" and "b" perform a photoelectric conversion on an incident optical signal (optical image) and accumulate electric charges according to the exposure amount. Reference numerals 402a and 402b denote transfer gates that, when each of signals txa and txb is set to a high level, transfer electric charges accumulated in the PDs 401a and 401b, respectively, to a floating diffusion unit (FD unit) 403. The FD unit 403 is connected to a gate of an FD amplifier 404 (floating diffusion amplifier) that converts the amount of electric charges transferred from the PDs 401a and 401b into voltages.

Reference numeral 405 denotes an FD reset switch that resets the FD unit 403 when a signal res is set to a high level. In case of resetting electric charges of the PDs 401a and 401b, simultaneously setting each of the signal res and the signals txa and txb to the high level turns on both the transfer gates 402a and 402b and the FD reset switch 405. Then, the PDs 401a and 401b are reset via the FD unit 403. Reference numeral 406 denotes a pixel selection switch that outputs, when a signal sel is set to a high level, a pixel signal converted into a voltage by the FD amplifier 404 to an output vout of the unit pixel 300 (pixel).

Referring back to FIG. 5, a vertical scanning circuit 301 supplies drive signals such as the signals res, txa, txb, and sel, for controlling a transistor of each pixel (the unit pixel 300) described above to the unit pixel 300. These drive signals are the same for each row of the pixel area PA. The output vout of each pixel is connected to a column common readout circuit 303 (clm1, clm2, . . . , clmk) via a vertical output line 302 for each column.

Figure 7:
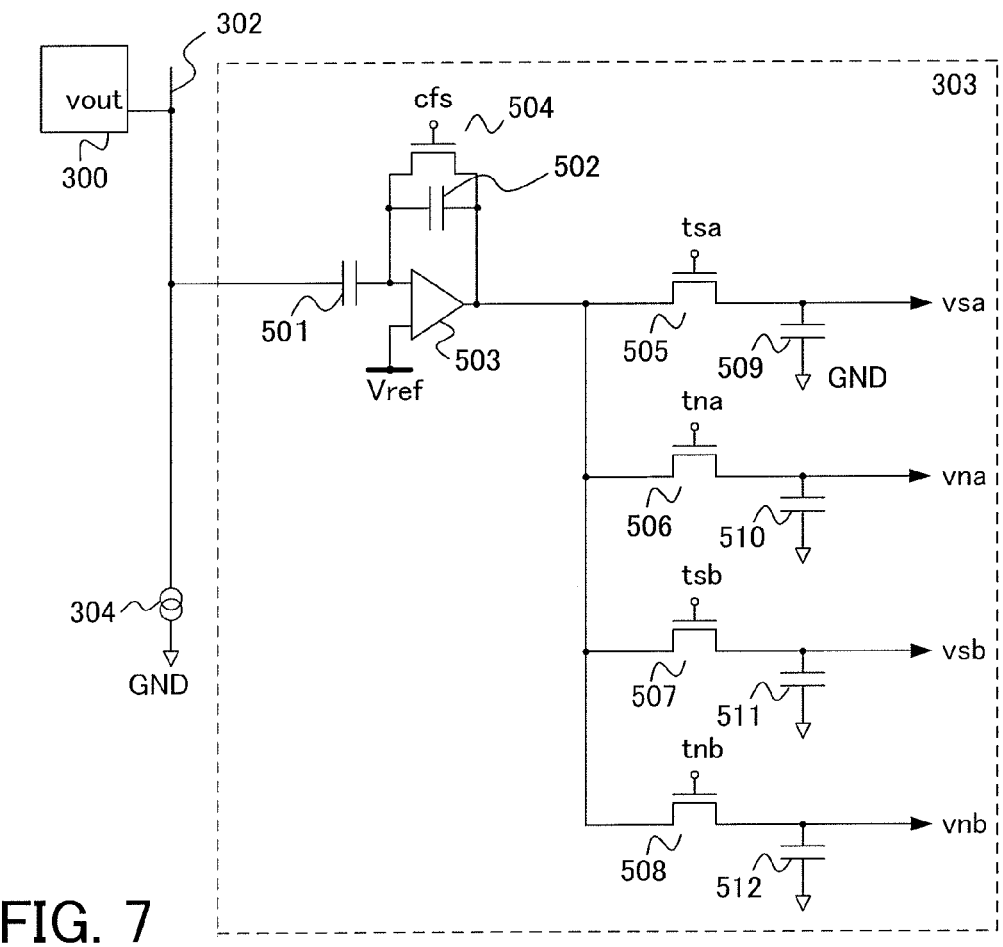
FIG. 7 is a configuration diagram of a column common readout circuit of the image pickup element in each of the embodiments.

Next, referring to FIG. 7, a circuit configuration of the column common readout circuit 303 will be described. FIG. 7 is a configuration diagram of the column common readout circuit 303. The vertical output line 302 is provided for each column and is connected to the outputs vout of one column of the unit pixels 300. The vertical output line 302 is connected to a current source 304, and the current source 304 and the FD amplifier 404 of the unit pixel 300 connected to the vertical output line 302 constitute a source follower circuit. Reference numeral 501 denotes a clamp capacitor C1, reference numeral 502 denotes a feedback capacitor C2, reference numeral 503 denotes a calculation amplifier, and a non-inverting input terminal is connected to a reference source Vref. Reference numeral 504 denotes a switch to short-circuit both ends of the feedback capacitor C2 that is controlled with a signal cfs.

Transfer switches 505 to 508 are switches for transferring signals read out from the unit pixel 300 to capacitors 509 to 512, respectively. Through a readout operation described later, the capacitor 509 (a first S signal storage capacitor) stores a pixel signal Sa of the sub pixel "a", and the capacitor 511 (a second S signal storage capacitor) stores an a/b addition signal Sab obtained by adding signals of the sub pixels "a" and "b". The capacitor 510 (a first N signal storage capacitor) and the capacitor 512 (a second N signal storage capacitor) both store a noise signal N of the unit pixel 300. The capacitors 509 to 512 are connected to outputs vsa, vna, vsb, and vnb of the column common readout circuit 303, respectively.

Referring back to FIG. 5, the outputs vsa and vna of the column common readout circuit 303 are connected to horizontal transfer switches 305 and 306, respectively. The horizontal transfer switches 305 and 306 are controlled by an output signal ha* ("*" is a column number of 1 to k) of a horizontal scanning circuit 311. When the signal ha* is set to a high level, signals of the capacitor 509 (the first S signal storage capacitor) and the capacitor 510 (the first N signal storage capacitor) are transferred to horizontal output lines 309 and 310, respectively. The outputs vsb and vnb of the column common readout circuit 303 are connected to horizontal transfer switches 307 and 308, respectively. The horizontal transfer switches 307 and 308 are controlled by an output signal hb* ("*" is a column number of 1 to k) of the horizontal scanning circuit 311. When the signal hb* is set to a high level, signals of the capacitor 511 (the second S signal storage capacitor) and the capacitor 512 (the second N signal storage capacitor) are transferred to the horizontal output lines 309 and 310, respectively.

The horizontal output lines 309 and 310 are connected to an input unit of a differential amplifier 314. The differential amplifier 314 calculates a difference between an S signal and an N signal, and simultaneously applies a predetermined gain to output a resulting output signal to an output terminal 315. Reference numerals 312 and 313 denote horizontal output line reset switches that, when a signal chres is set high, turn on to reset the horizontal output lines 309 and 310, respectively, to a reset voltage Vchres.

Figure 8:
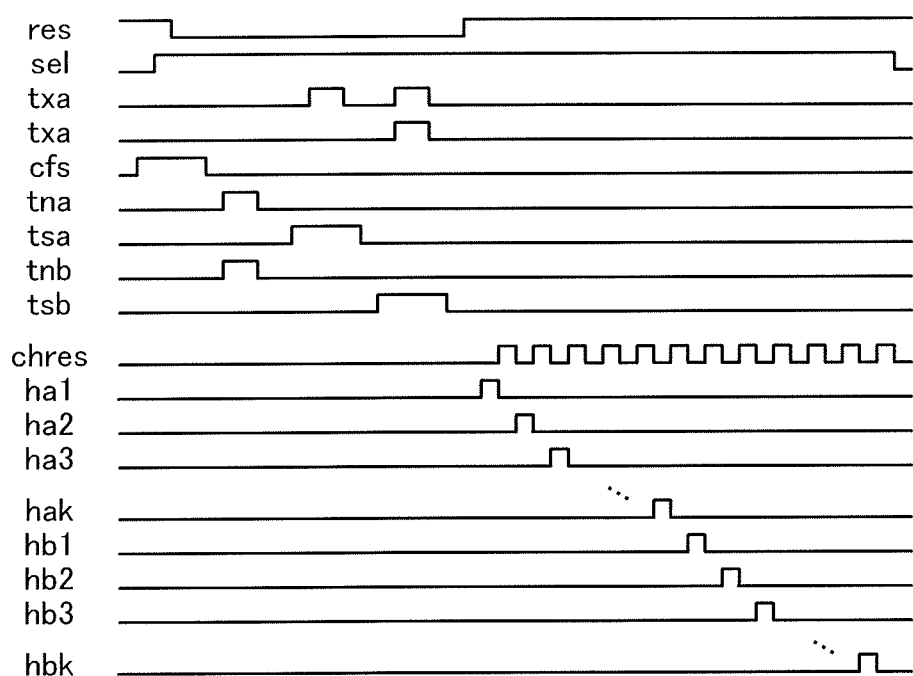
FIG. 8 is a timing chart illustrating a readout operation of each row of the image pickup element in each of the embodiments.

Next, referring to FIG. 8, a readout operation of the image pickup element 106 will be described. FIG. 8 is a timing chart illustrating a readout operation of each row of the image pickup element 106. The signal cfs is first set to a high level to turn on the switch 504, thereby setting the calculation amplifier 503 to a buffering state. Subsequently, the signal sel is set to the high level to turn on the pixel selection switch 406 of a pixel. Then, the signal res is set to a low level to turn off the FD reset switch 405, thereby releasing reset of the FD unit 403.

Subsequently, the signal cfs is set back to a low level to turn off the switch 504, and then each of the signals tna and tnb is set to a high level. This causes the N signals to be stored in the capacitor 510 (the first N signal storage capacitor) and the capacitor 512 (the second N signal storage capacitor) via the transfer switches 506 and 508, respectively.

Subsequently, after the signals tna and tnb are set low to turn off the transfer switches 506 and 508, a signal tsa is set to a high level to turn on the transfer switch 505 and the signal txa is set to the high level to turn on the transfer gate 402a. This operation outputs signals accumulated in the PD 401a of the sub pixel "a" to the vertical output line 302 via the FD amplifier 404 and the pixel selection switch 406. A signal of the vertical output line 302 is amplified by the calculation amplifier 503 with a gain according to a capacitance ratio between the clamp capacitor C1 and the feedback capacitor C2, and is stored in the capacitor 509 (the first S signal storage capacitor) via the transfer switch 505 (the pixel signal Sa).

Subsequently, after the signal txa and the signal tsa are sequentially set to low levels, a signal tsb is set to a high level to turn on a transfer switch 507 and the signals txa and txb are set to the high levels to turn on the transfer gates 402a and 402b. This operation adds signals accumulated in the PD 402b of the sub pixel "b" to the signals of the sub pixel "a" at the FD unit 403 to output an addition signal to the vertical output line 302 via the FD amplifier 404 and the pixel selection switch 406. A signal of the vertical output line 302 is amplified by the calculation amplifier 503 with a gain according to a capacitance ratio between the clamp capacitor C1 and the feedback capacitor C2, and is stored in the capacitor 511 (the second S signal storage capacitor) via the transfer switch 505 (the a/b addition signal Sab). Then, after the transfer gates 402a and 402b and the transfer switch 507 are sequentially turned off, the signal res is set to a high level to turn on the FD reset switch 405, thereby resetting the FD unit 403.

Subsequently, an output ha1 of the horizontal scanning circuit 311 is set to a high level to turn on the horizontal transfer switches 305 and 306. Then, signals of the capacitor 509 (the first S signal storage capacitor) and the capacitor 510 (the first N signal storage capacitor) are output to the output terminal 315 via the horizontal output lines 309 and 310 and the differential amplifier 314. The horizontal scanning circuit 311 sequentially sets high the output signals ha1, ha2, . . . hak as selection signals of the respective columns, thereby outputting signals (image signals A) of the sub pixel "a" for each row.

Following completion of readout of the image signal A, an output signal hb1 of the horizontal scanning circuit 311 is set to a high level to turn on the horizontal transfer switches 307 and 308. Then, signals of the capacitor 511 (the first S signal storage capacitor) and the capacitor 512 (the first N signal storage capacitor) are output to the output terminal 315 via the horizontal output lines 309 and 310 and the differential amplifier 314. The horizontal scanning circuit 311 sequentially sets high the output signals hb1, hb2, . . . , hbk as selection signals of the respective columns, thereby outputting a/b addition signals (image signals AB) for each row.

While signals of the respective column are readout with the output signals ha1 to hak and the output signals hb1 to hbk, the signal chres is set to a high level. This turns on the horizontal output line reset switches 312 and 313 to once reset the horizontal output lines 309 and 310 to the level of the reset voltage Vchres.

The embodiments of the image pickup apparatus 100 and a signal processing method will be described in detail below.

First Embodiment

Figure 9:
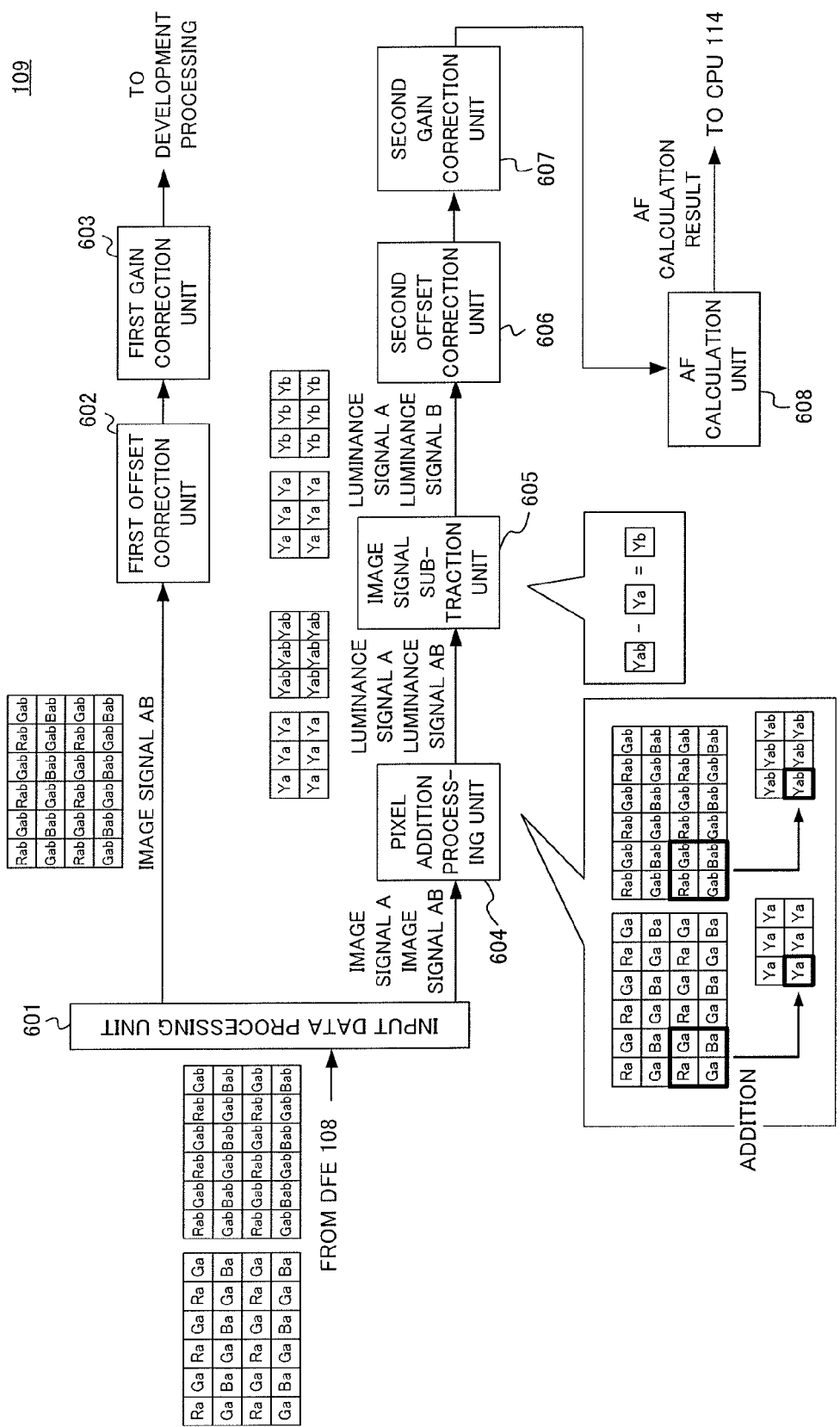
FIG. 9 is a block diagram of a digital signal processor (DSP) and an explanatory diagram of signal processing in an image pickup apparatus in a first embodiment.

First, referring to FIG. 9, a method of performing signal processing on the image signal A and the image signal AB in a first embodiment of the present invention will be described. FIG. 9 is a block diagram of the DSP 109 and an explanatory diagram of signal processing in the present embodiment.

Reference numeral 601 denotes an input data processing unit. The input data processing unit 601 receives, via the AFE 107 and the DFE 108, signals (the image signal A and the image signal AB) read out from the image pickup element 106 by the readout operation described above. The input data processing unit 601 outputs the image signal A input from the DFE 108 to a pixel addition processing unit 604 (pixel addition processor). The input data processing unit 601 also outputs the image signal AB input from the DFE 108 to a first offset correction unit 602 and the pixel addition processing unit 604.

The first offset correction unit 602 performs an offset correction on the image signal AB using data previously stored in a ROM 119. In the present embodiment, the first offset correction unit 602 performs offset addition and subtraction for each pixel column. Reference numeral 603 denotes a first gain correction unit. The first gain correction unit 603 performs a gain correction on the image signal AB using data previously stored in the ROM 119. In the present embodiment, the first gain correction unit 603 performs multiplication by a predetermined gain for each pixel column to correct a gain difference for the column. The signal corrected by the first offset correction unit 602 and the first gain correction unit 603 is then subjected to development processing to be used in generation of an image such as a still image or a moving image.

The pixel addition processing unit 604 performs pixel addition processing on the image signals A and the image signals AB. In the present embodiment, the pixel addition processing unit 604 performs addition of pixel signals (the image signals A or the image signals AB) in Bayer units of 2×2 pixels to generate luminance signals A or luminance signals AB. This processing reduces each of the data quantities of the image signals A and the image signals AB by half in the horizontal direction and by half in the vertical direction. Reference numeral 605 denotes an image signal subtraction unit (image signal subtractor). The image signal subtraction unit 605 subtracts the luminance signal A (Ya) from the luminance signal AB (Yab) to generate a luminance signal B (Yb). The luminance signal AB (Yab) is a signal obtained by adding the signals of the sub pixels "a" and "b", and the luminance signal A (Ya) is the signal of the sub pixel "a". Their difference (Yab−Ya) is therefore the luminance signal B (Yb) of the sub pixel "b".

A second offset correction unit 606 performs an offset correction on the luminance signal A and the luminance signal B using data previously stored in the ROM 119. In the present embodiment, the second offset correction unit 606 performs offset addition and subtraction on the luminance signals A and the luminance signals B in units of the columns after being subjected to the addition at the pixel addition processing unit 604. Reference numeral 607 denotes a second gain correction unit. The second gain correction unit 607 performs a gain correction on the luminance signal A and the luminance signal B using data previously stored in the ROM 119. In the present embodiment, the second gain correction unit 607 performs multiplication by a predetermined gain to correct a gain difference for each column in units of the columns after being subjected to the addition at the pixel addition processing unit 604. The signals corrected at the second offset correction unit 606 and the second gain correction unit 607 are output to an AF calculation unit 608 (focus detection unit). The AF calculation unit 608 then performs an AF calculation based on the corrected signals to detect the amount of defocus (calculates the amount of focus shift of an object). At the same time, the AF calculation unit 608 performs focus detection based on the luminance signals A (first signals) and the luminance signals B (third signals). The CPU 114 then controls the focus drive circuit 116 based on the calculation result of the AF calculation unit 608 to perform focusing.

The present embodiment describes a configuration in which the DSP 109 performs the whole set of processing, but is not limited to this configuration. For example, as illustrated in FIG. 10, the DSP 109 may perform the functions of the first offset correction unit 602 and the first gain correction unit 603, and the DFE 108 may perform the other functions.

Figure 10:
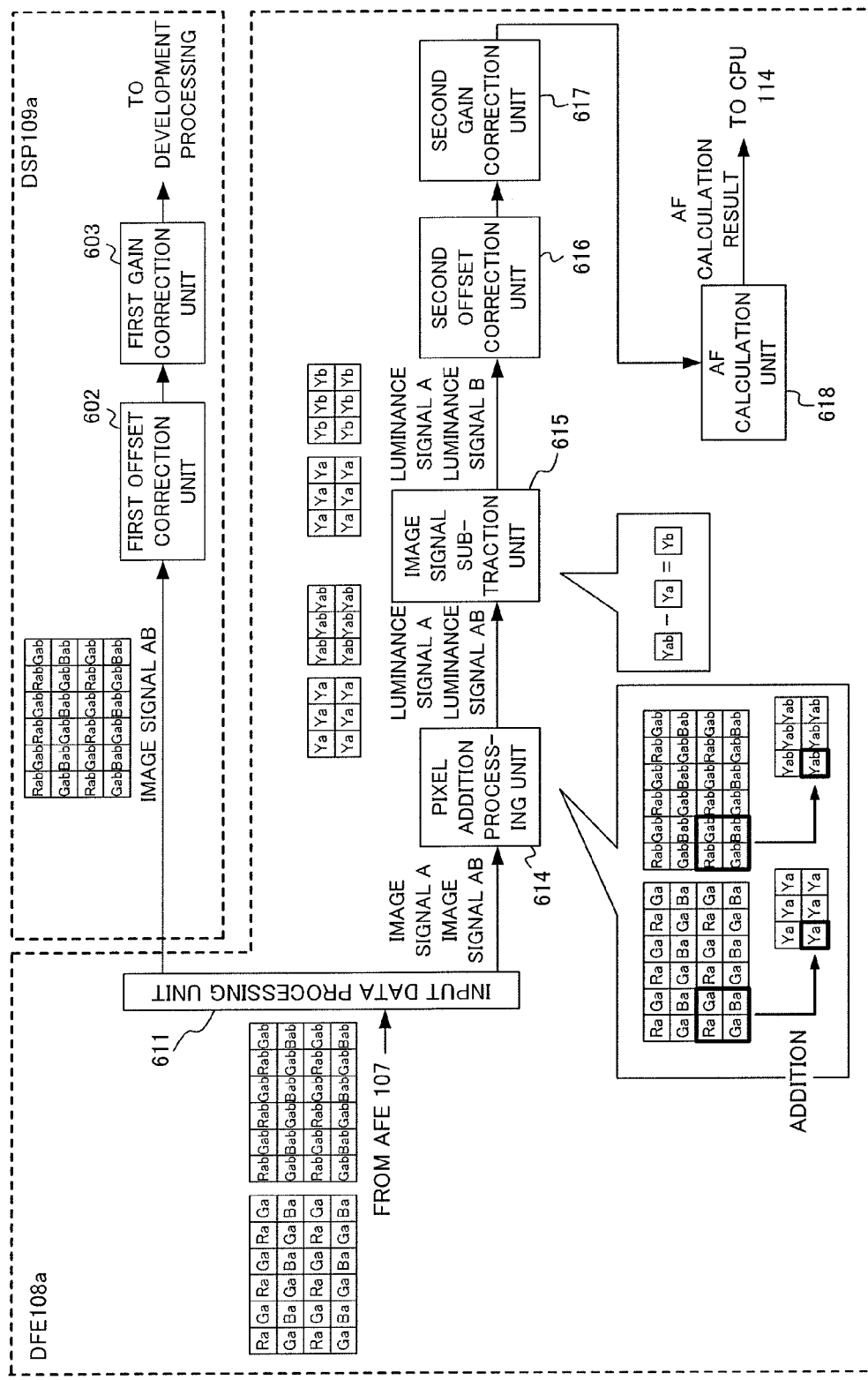
FIG. 10 is a block diagram of a digital front end (DFE) and a DSP and an explanatory diagram of signal processing in an image pickup apparatus in a modification of the first embodiment.

FIG. 10 is a block diagram of the DFE 108a and the DSP 109a and an explanatory diagram of signal processing in a modification of the present embodiment. As illustrated in FIG. 10, in the present modification, the DFE 108a includes an input data processing unit 611, a pixel addition processing unit 614, an image signal subtraction unit 615, a second offset correction unit 616, a second gain correction unit 617, and an AF calculation unit 618. The DSP 109a includes the first offset correction unit 602 and the first gain correction unit 603. With such a configuration, the advantages of the present embodiment can be obtained.

As described above, the image pickup element 106 includes a plurality of pixels (the unit pixels 300) corresponding to the respective micro lenses. The image pickup element 106 includes the first photoelectric conversion portion (sub pixel "a") and the second photoelectric conversion portion (sub pixel "b") that are included in each of the pixels to share the corresponding one of the micro lenses.

The signal processor (the DFE 108 or the DSP 109) acquires and corrects the addition signal (the image signal AB) of outputs from the first photoelectric conversion portion and the second photoelectric conversion portion included in each of the pixels. The signal processor also acquires a plurality of signals (the image signals A) of the first photoelectric conversion portions corresponding to the respective micro lenses and corrects the first signals (the luminance signals A) generated from the plurality of signals.

As described above, the image pickup element 106 outputs the addition signals (the image signals AB) and the plurality of signals (the image signals A) to the signal processor (the DFE 108 or the DSP 109). The signal processor generates the first signals from the plurality of signals. The signal processor then corrects the addition signal for each of the pixels and corrects the first signal for the first photoelectric conversion portions. The signal processor preferably performs an offset correction or a gain correction on each of the addition signals and each of the first signals.

In the present embodiment, the signal processor (the pixel addition processing unit 604 or 614) generates the second signals (the luminance signals AB) from a plurality of addition signals of the first photoelectric conversion portions (the sub pixels "a") and the second photoelectric conversion portions (the sub pixels "b") that correspond to the respective micro lenses. The signal processor (the image signal subtraction unit 605 or 615) also subtracts the first signal from the second signal to generate the third signal (the luminance signal B). The signal processor (the second offset correction unit 606 or 616, and the second gain correction unit 607 or 617) then corrects the third signal for the second photoelectric conversion portions.

With the configuration of the present embodiment, signals (the image signals A and the image signals AB) used for the AF calculation have their data quantities reduced at the pixel addition processing unit 604 and then are subjected to corrections (an offset correction and a gain correction). This reduces the amount of correction data used for the image signals A and the image signals AB. In the present embodiment, the data quantities are reduced by half in the horizontal direction. The amount of correction data is thus reduced by half compared to a case of performing the corrections without the pixel addition. This allows reduction of the amount of memory of the ROM 119, which stores the correction data.

Second Embodiment

Figure 11:
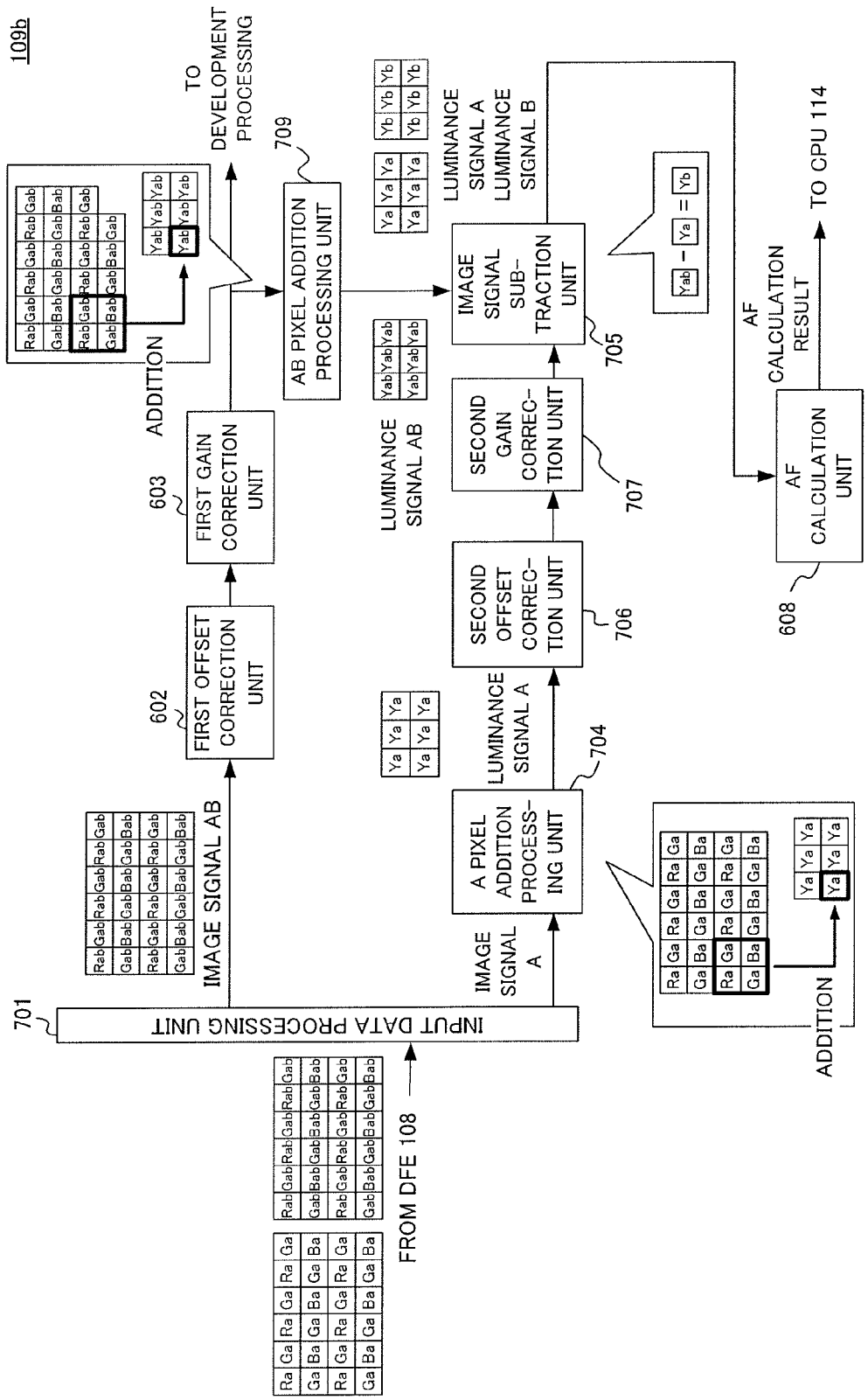
FIG. 11 is a block diagram of a DSP and an explanatory diagram of signal processing in an image pickup apparatus in a second embodiment.

Next, referring to FIG. 11, a method of performing signal processing on the image signal A and the image signal AB in a second embodiment of the present invention will be described. FIG. 11 is a block diagram of a DSP 109b and an explanatory diagram of signal processing in the present embodiment. In the present embodiment, correction data for the luminance signal B (Yb) is unnecessary, thereby further reducing the amount of correction data compared to the first embodiment.

In FIG. 11, an input data processing unit 701 receives the image signals A and the image signals AB output from the DFE 108. The input data processing unit 701 then outputs the image signals A to an A pixel addition processing unit 704. The input data processing unit 701 also outputs the image signals AB to the first offset correction unit 602.

In the present embodiment, the first offset correction unit 602 and the first gain correction unit 603 are the same as in the first embodiment. Reference numeral 709 denotes an AB pixel addition processing unit. The AB pixel addition processing unit 709 performs pixel addition processing on the image signals AB corrected at the first offset correction unit 602 and the first gain correction unit 603. Similarly to the pixel addition processing unit 604 described in the first embodiment, the AB pixel addition processing unit 709 adds pixel signals (the corrected image signals AB) in Bayer units of 2×2 pixels to generate the luminance signals AB (Yab). The A pixel addition processing unit 704 performs similar pixel addition processing on the image signals A to generate the luminance signals A (Ya). Through the processing at the AB pixel addition processing unit 709 and the A pixel addition processing unit 704, each of the data quantities of the image signals AB and the image signals A is reduced by half in the horizontal direction and by half in the vertical direction.

Following the pixel addition processing at the A pixel addition processing unit 704, a second offset correction unit 706 and a second gain correction unit 707 perform an offset correction and a gain correction on the luminance signal A. These corrections are the same as in the first embodiment. An image signal subtraction unit 705 subtracts the luminance signal A (Ya) output from the second gain correction unit 707 from the luminance signal AB (Yab) output from the AB pixel addition processing unit 709 to generate the luminance signal B (Yb). The luminance signals A and the luminance signals B output from the image signal subtraction unit 705 are input to the AF calculation unit 608. Similarly to the first embodiment, the AF calculation unit 608 performs the AF calculation based on the luminance signals A and the luminance signals B.

As described above, a signal processor (the first offset correction unit 602 and the first gain correction unit 603) in the present embodiment corrects, for each pixel, a plurality of addition signals (the image signals AB) of the first photoelectric conversion portions and the second photoelectric conversion portions that correspond to the respective micro lenses. After the correction, the signal processor (the AB pixel addition processing unit 709) generates the second signals (the luminance signals AB) from the addition signals. The signal processor (the image signal subtraction unit 705) then subtracts the first signals (the corrected luminance signals A) corrected for the first photoelectric conversion portions from the second signals (the luminance signals AB) to generate the third signals (the luminance signals B).

The configuration of the present embodiment eliminates the need for correcting the luminance signals B at the second offset correction unit 706 and the second gain correction unit 707. This configuration further reduces the total amount of correction data.

Third Embodiment

Figure 12:
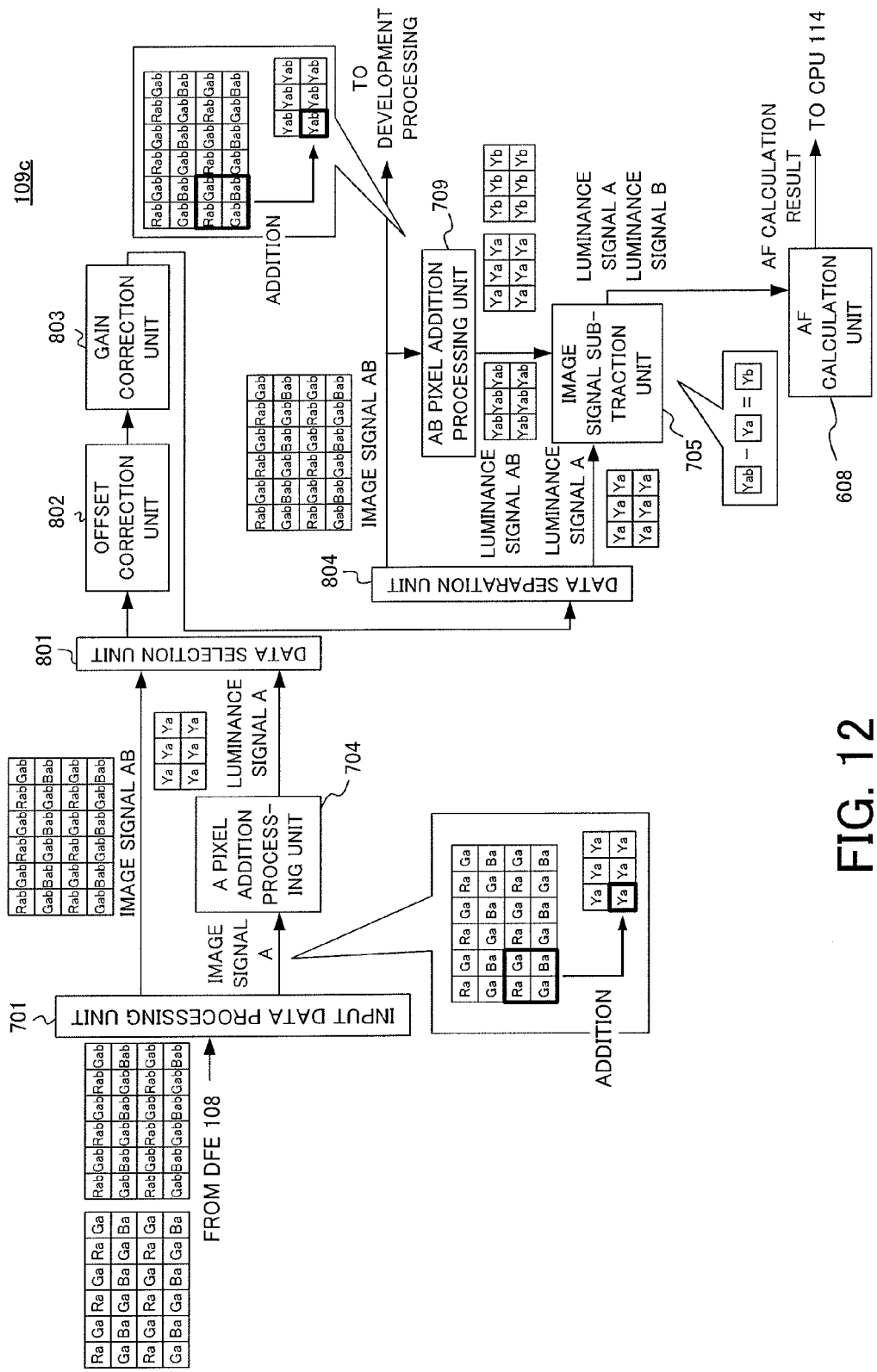
FIG. 12 is a block diagram of a DSP and an explanatory diagram of signal processing in an image pickup apparatus in a third embodiment.

Next, referring to FIG. 12, a method of performing signal processing on the image signal A and the image signal AB in a third embodiment of the present invention will be described. FIG. 12 is a block diagram of a DSP 109c and an explanatory diagram of signal processing in the present embodiment. In the present embodiment, a correction unit is shared to correct both the image signal AB and the luminance signal A, thereby allowing corrections of both signals through a small sized circuit.

In FIG. 12, the input data processing unit 701 and the A pixel addition processing unit 704 are the same as in the second embodiment. Reference numerical 801 denotes a data selection unit. The data selection unit 801 controls outputting the image signal AB and the luminance signal A to a shared offset correction unit 802 in time division. The offset correction unit 802 performs offset corrections on the image signal AB and the luminance signal A. The offset correction unit 802 performs an offset correction on the data input from the data selection unit 801 for each column. In this manner, an offset correction for each pixel column is performed on the image signal AB, and an offset correction for each addition column is performed on the luminance signal A. A gain correction unit 803 performs gain corrections on the image signal AB and the luminance signal A. The gain correction unit 803 performs a gain correction on the input data for each column. In this manner, a gain correction for each pixel column is performed on the image signal AB, and a gain correction for each addition column is performed on the luminance signal A.

Reference numeral 804 denotes a data separation unit. The data separation unit 804 outputs the corrected image signal AB to a development processing block (not illustrated) and also to the AB pixel addition processing unit 709. The data separation unit 804 also outputs the luminance signal A to the image signal subtraction unit 705. The AB pixel addition processing unit 709 and the image signal subtraction unit 705 are the same as in the second embodiment. Similarly to the first and the second embodiments, the luminance signals A and the luminance signals B generated at the image signal subtraction unit 705 are used for the AF calculation at the AF calculation unit 608.

As described above, in the present embodiment, a signal processor (the data selection unit 801, the offset correction unit 802, and the gain correction unit 803) corrects the addition signal (the image signal AB) for each pixel and corrects the first signal (the luminance signal A) for the first photoelectric conversion portions in time division. With the configuration of the present embodiment, the correction unit is shared to correct the image signal AB and the luminance signal A, thereby allowing corrections of both signals through a small sized circuit.

Fourth Embodiment

Figure 13:
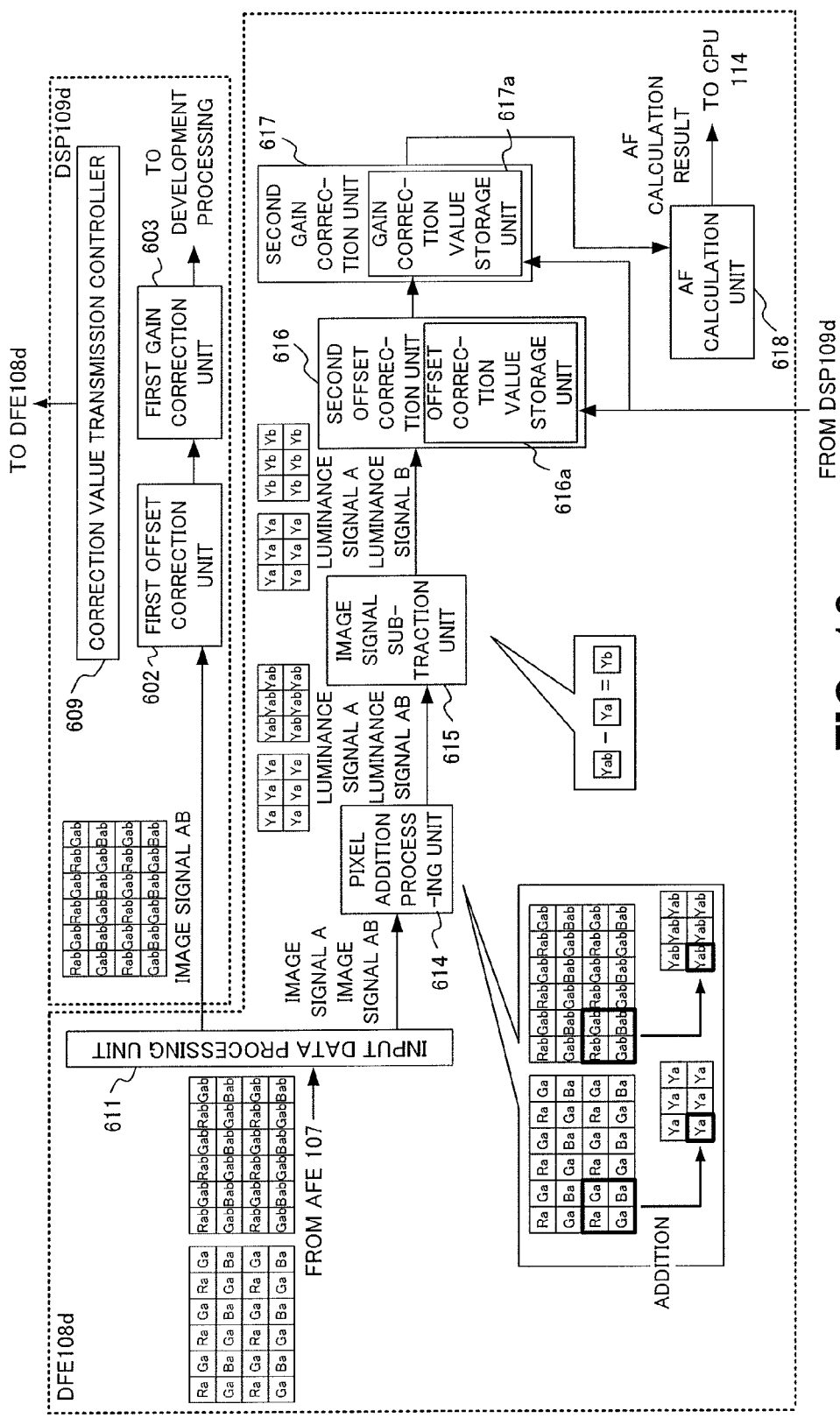
FIG. 13 is a block diagram of a DFE and a DSP and an explanatory diagram of signal processing in an image pickup apparatus in a fourth embodiment.

Next, referring to FIG. 13, a method of performing signal processing on the image signal A and the image signal AB in a fourth embodiment of the present invention will be described. FIG. 13 is a block diagram of a DFE 108d and a DSP 109d and an explanatory diagram of signal processing in the present embodiment.

Reference numeral 611 denotes the input data processing unit. The input data processing unit 611 receives, via the AFE 107, signals (the image signal A and the image signal AB) read out from the image pickup element 106 through the readout operation described above. The input data processing unit 611 outputs the image signal A to the pixel addition processing unit 614. The input data processing unit 611 also outputs the image signal AB to the pixel addition processing unit 614 and the first offset correction unit 602 (a dark shading correction unit) of the DSP 109d.

When the image signal AB is input to the DSP 109d, the first offset correction unit 602 performs an offset correction (dark shading correction) on the image signal AB using data previously stored in the ROM 119. In the present embodiment, the first offset correction unit 602 performs offset addition and subtraction for each pixel column. Reference numeral 603 denotes the first gain correction unit. The first gain correction unit 603 performs a gain correction on the image signal AB using data previously stored in the ROM 119. In the present embodiment, the first gain correction unit 603 performs multiplication by a predetermined gain for each pixel column to correct a gain difference for the column. The signals corrected at the first offset correction unit 602 and the first gain correction unit 603 are then subjected to development processing to generate an image (shot image) such as a still image or a moving image based on the signals.

The pixel addition processing unit 614 performs pixel addition processing on the image signals A and the image signals AB. In the present embodiment, the pixel addition processing unit 614 adds pixel signals in Bayer units of 2×2 pixels to generate luminance signals. This processing reduces each of the data quantities of the image signals A and the image signals AB by half in the horizontal direction and by half in the vertical direction. Reference numeral 615 denotes the image signal subtraction unit. The image signal subtraction unit 615 subtracts the luminance signal A (Ya) from the luminance signal AB (Yab) to generate the luminance signal B (Yb). The luminance signal AB (Yab) corresponds to the addition signal of signals of the sub pixels "a" and "b", whereas the luminance signal A (Ya) corresponds to the signal of the sub pixel "a". The luminance signal B (Yb), which is the difference (Yab−Ya), is therefore the luminance signal of the sub pixel "b".

The second offset correction unit 616 performs offset corrections on the luminance signal A and the luminance signal B. In the present embodiment, the second offset correction unit 616 performs offset addition and subtraction for each column after being subjected to the addition at the pixel addition processing unit 614. Reference numeral 616a denotes an offset correction value storage unit. The offset correction value storage unit 616a includes a RAM and is capable of storing offset correction values for one line. The second offset correction unit 616 performs the offset corrections by subtracting the offset correction value stored in the offset correction value storage unit 616a from the luminance signal A and the luminance signal B. Data previously stored in the ROM 119 is written as the offset correction value to the offset correction value storage unit 616a via the DSP 109d.

Reference numeral 617 denotes the second gain correction unit. The second gain correction unit 617 performs gain corrections on the luminance signal A and the luminance signal B. In the present embodiment, the second gain correction unit 617 performs multiplication by a predetermined gain for each column after being added at the pixel addition processing unit 614 to correct a gain difference for the column. Reference numeral 617a denotes a gain correction value storage unit. The gain correction value storage unit 617a includes a RAM and is capable of storing gain correction values for one line. The second gain correction unit 617 performs the gain corrections by subtracting gain correction data stored in the gain correction value storage unit 617a from the luminance signal A and the luminance signal B. Data previously stored in the ROM 119 is written as a gain correction value to the gain correction value storage 617a via the DSP 109d.

The signals (the luminance signals A and the luminance signals B) corrected at the second offset correction unit 616 and the second gain correction unit 617 are output to the AF calculation unit 618. The AF calculation unit 618 performs the AF calculation using the luminance signals A and the luminance signals B to detect the amount of defocus. The CPU 114 then controls the focus drive circuit 116 based on the calculation result of the AF calculation unit 618 to perform focusing. Reference numeral 609 denotes a correction value transmission controller (correction value transmission control unit). The correction value transmission controller 609 performs a control to read out an offset correction value and a gain correction value stored in the ROM 119 and transmit them to the DFE 108d.

Figure 14:
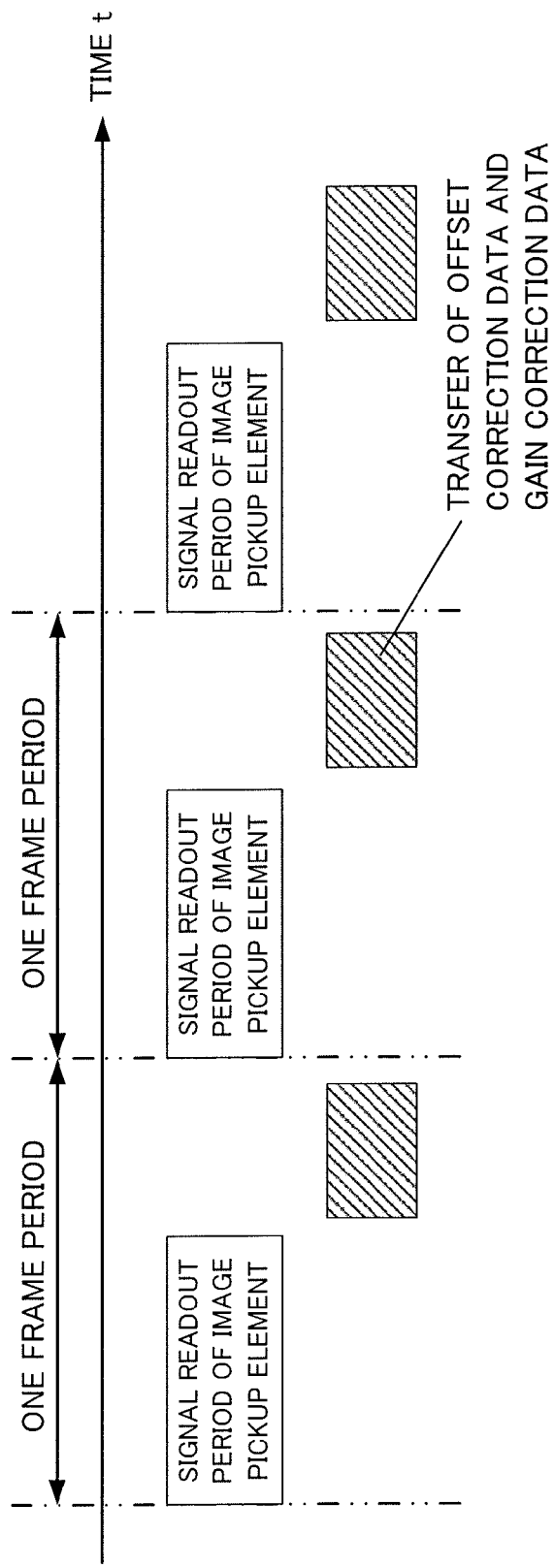
FIG. 14 is an explanatory diagram of transfer timing of a correction value from the DSP to the DFE in the image pickup apparatus in the fourth embodiment.

Next, referring to FIG. 14, transmission (transfer) from the DSP 109d to the DFE 108d will be described. FIG. 14 is an explanatory diagram of transfer timing of an offset correction value and a gain correction value from the DSP 109d to the DFE 108d.

As illustrated in FIG. 14, the offset correction value and the gain correction value are transferred out of a signal readout period of the image pickup element 106 in each frame. The correction values (the offset correction value and the gain correction value) according to the ISO sensitivity setting of the next frame are transferred from the DSP 109d and used to correct the luminance signal A and the luminance signal B read out from the image pickup element 106. In the present embodiment, the correction values are transferred in each frame. This configuration allows correction values according to the changed ISO setting to be used when the ISO sensitivity setting changed at a certain frame, thereby achieving an appropriate correction operation.

As described above, in the present embodiment, a signal processor (the DFE 108d) includes a correction value storage unit (the offset correction value storage unit 616a and the gain correction value storage unit 617a) that stores a correction value used to correct the first signal (the luminance signal A) or the third signal (the luminance signal B). The signal processor (the DSP 109d) also includes the correction value transmission controller 609 that transmits the correction value to the correction value storage unit. The configuration of the present embodiment allows an appropriate correction of a signal read out from the image pickup element 106 without the DFE 108d provided with a storage (RAM) having a large capacity, thereby performing a highly accurate focusing.

Fifth Embodiment

Figure 15:
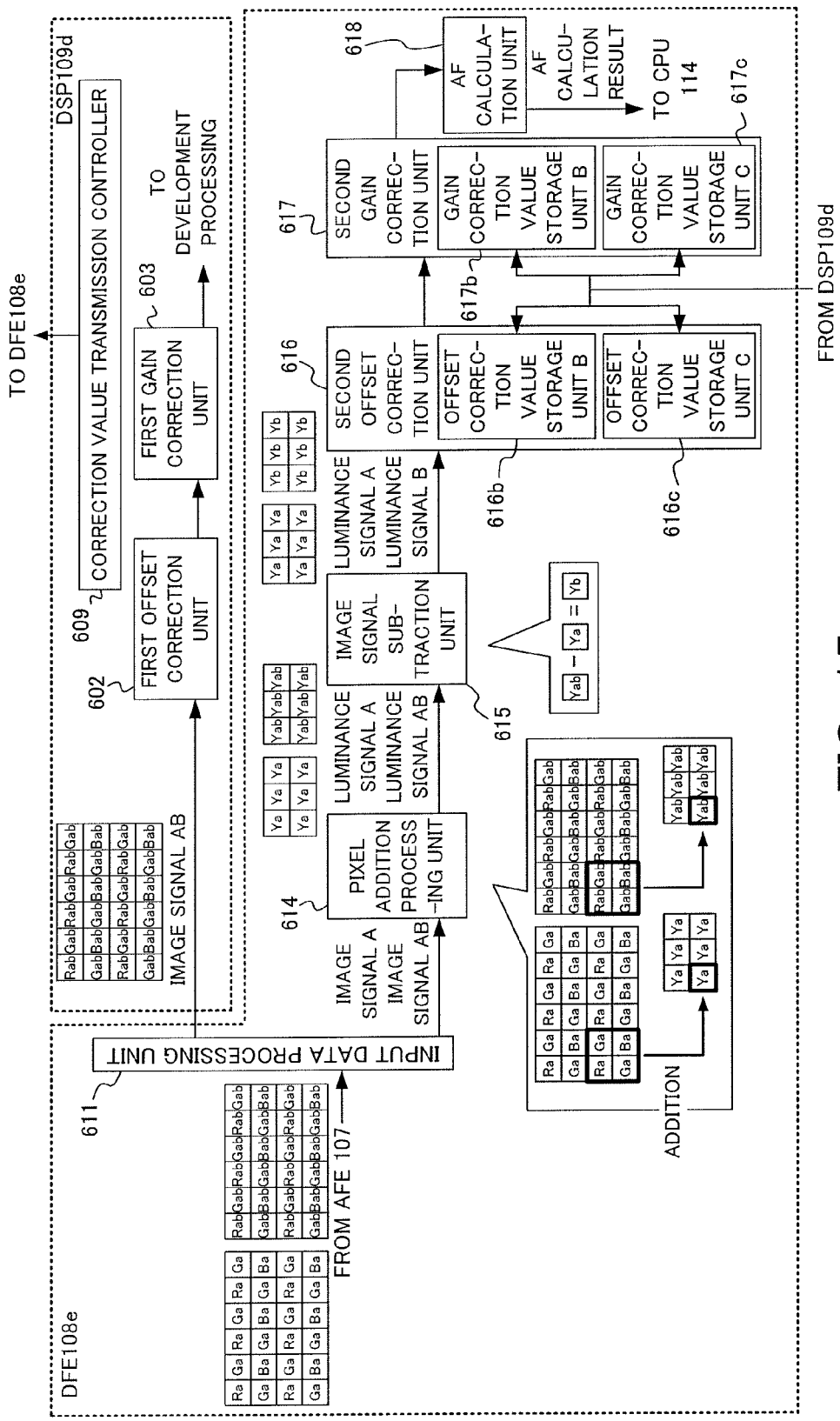
FIG. 15 is a block diagram and an explanatory diagram of signal processing of a DFE and a DSP in an image pickup apparatus in a fifth embodiment.

Next, referring to FIG. 15, a method of performing signal processing on the image signal A and the image signal AB in a fifth embodiment of the present invention will be described. FIG. 15 is a block diagram of a DFE 108e and the DSP 109d and an explanatory diagram of signal processing in the present embodiment.

In the fourth embodiment, the offset correction value and the gain correction value are transferred out of the signal readout period of the image pickup element 106. Time out of the signal readout period is, however, limited in each frame. This potentially causes a shortage of time when a large amount of data is required for the correction values to be transferred or when the speed of transfer is low. To address this difficulty, in the present embodiment, the transfer operation of the correction values is allowed during the signal readout period of the image pickup element 106.

As illustrated in FIG. 15, the second offset correction unit 616 includes two storage units of an offset correction value storage unit B (616b) and an offset correction value storage unit C (616c). Data in the storage units are alternately used to perform a correction at each frame. Similarly, the second gain correction unit 617 includes two storage units of a gain correction value storage unit B (617b) and a gain correction value storage unit C (617c).

Figure 16:
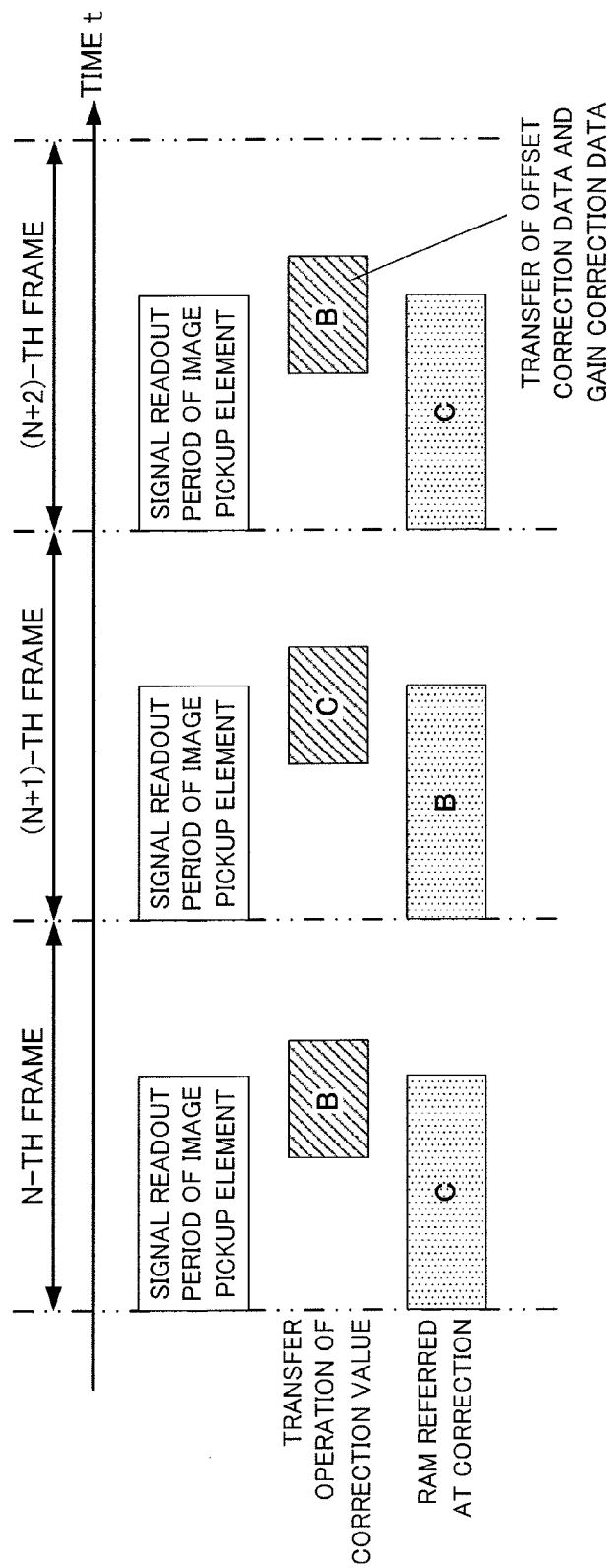
FIG. 16 is an explanatory diagram of transfer timing of a correction value from the DSP to the DFE in the image pickup apparatus in the fifth embodiment.

Next, referring to FIG. 16, transfer timing of an offset correction value and a gain correction value from the DSP 109d to the DFE 108e will be described. FIG. 16 is an explanatory diagram of the transfer timing of an offset correction value and a gain correction value from the DSP 109d to the DFE 108e. The correction value transmission controller 609 performs a transfer operation of the correction values in a frame (the n-th frame) for the offset correction value storage unit B (616b) and the gain correction value storage unit B (617b). In the next (n+1)-th frame, the second offset correction unit 616 and the second gain correction unit 617 perform correction operations using the correction values transferred during the n-th frame period. In parallel to these operations, a transfer operation of correction values is performed for the offset correction value storage unit C (616c) and the gain correction value storage unit C (617c). In the next (n+2)-th frame, the corrections are performed using the correction values transferred in the (n+1)-th frame, and in parallel to this, correction data is transferred to the offset correction value storage unit B and the gain correction value storage unit B.

As described above, the correction value storage unit includes a first correction value storage unit (the offset correction value storage unit B (616b) and the gain correction value storage unit B (617b)) and a second correction value storage unit (the offset correction value storage unit C (616c) and the gain correction value storage unit C (617c)). The signal processor (the DFE 108e) selectively corrects at each frame the first signals (the luminance signals A) or the third signals (the luminance signals B) using correction values stored in the first correction value storage unit or the second correction value storage unit.

The configuration of the present embodiment allows the correction value transmission controller 609 to perform the transfer operation of correction values in the signal readout period of the image pickup element 106 during which the second offset correction unit 616 and the second gain correction unit 617 perform correction operations. This secures a sufficient transfer time even for a large amount of transfer data or a low speed of transfer.

In the present embodiment, the offset correction value storage unit B (616*b*) and the offset correction value storage unit C (616*c*) are alternately selected to be referred by the second offset correction unit 616 at each frame. The present embodiment is, however, not limited to this configuration, but one of the two storage units may be set for referring correction values, whereas the other may be used for writing by the correction value transmission controller 609. For example, a configuration is allowed in which the second offset correction unit 616 always refers to a correction value stored in the offset correction value storage unit B (616*b*) whereas the correction value transmission controller 609 always writes a correction value in the offset correction value storage unit C (616*c*). In this case, a correction value needs to be transferred from the offset correction value storage unit C (616*c*) to the offset correction value storage unit B (616*b*) before a correction starts in each frame.

In this case, the signal processor (the DFE 108*e*) corrects the first signal (the luminance signal A) or the third signal (the luminance signal B) using correction values stored in the first correction value storage unit (the offset correction value storage unit B (616*b*) and the gain correction value storage unit B (617*b*)). The correction value transmission controller 609 transmits correction values to the second correction value storage unit ((the offset correction value storage unit C (616*c*) and the gain correction value storage unit C (617*c*)).

Sixth Embodiment

Figure 17A:
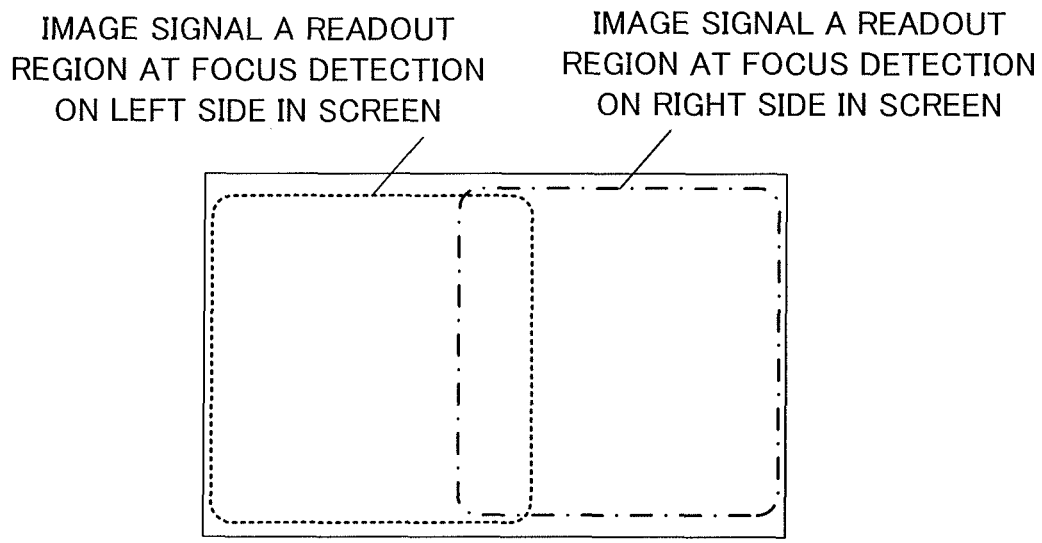
FIGS. 17A and 17B are explanatory diagrams of a readout region of an image signal A and a correction value in a sixth embodiment.
Figure 17B:
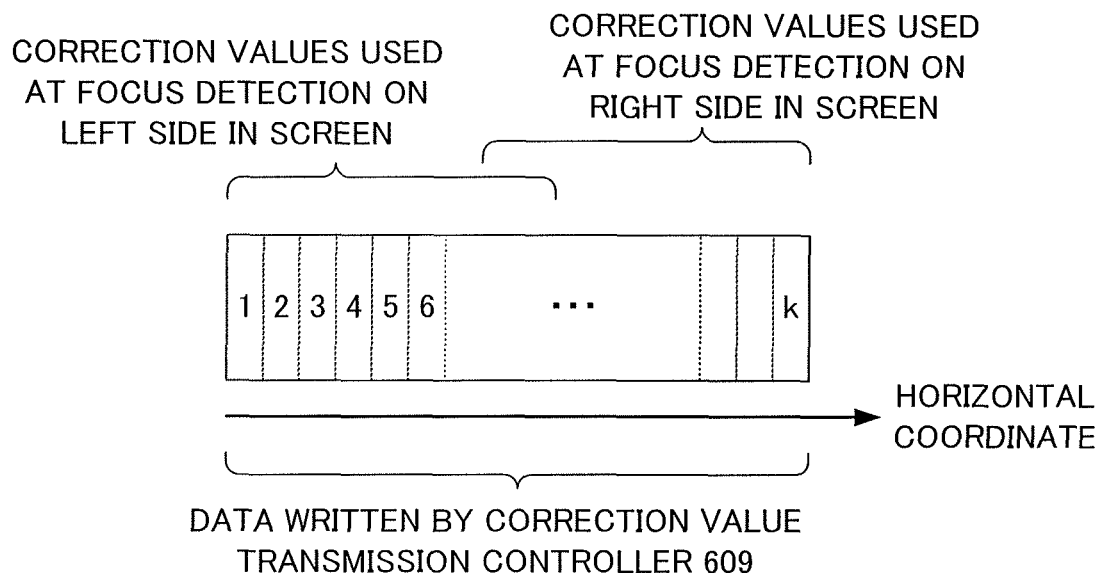

Next, referring to FIGS. 17A and 17B, signal processing in a sixth embodiment of the present invention will be described. FIGS. 17A and 17B are explanatory diagrams of a readout region of the image signal A and a correction value (offset correction value), respectively. In a readout operation of the image pickup element 106, depending on the frame rate, the image signals A for one line are not thoroughly read out, but only signals in the vicinity of a focus detection region are read out in some cases. The present embodiment describes a configuration in a case of reading out the image signals A in a portion of region in the horizontal direction.

FIG. 17A is a relational diagram of the focus detection region and the image signal A readout region. As illustrated in FIG. 17A, when the focus detection region exists on the left side in the screen, the image signals A in the region enclosed by the dotted line are read out. On the other hand, when the focus detection region exists on the right side in the screen, the image signals A in the region enclosed by the dashed and single-dotted line are read out.

To read out from the region enclosed by the dotted line in FIG. 17A, in the timing chart illustrated in FIG. 8, the operation of the horizontal scanning circuit 311 for reading out the image signal A may be started at outputting the signal ha1 and stopped when the scanning is performed up to the right end of the dotted line frame. To read out from the region enclosed by the dashed and single-dotted line, the operation of the horizontal scanning circuit 311 may be started at the column corresponding to the left end of the dashed and single-dotted line frame and stopped when the scanning is performed up to the signal hak on the right end.

FIG. 17B is a relational diagram of correction values stored in the offset correction value storage unit 616*a* (or, 616*b* or 616*c*) and those used in correction by the offset correction unit 616. In writing of offset correction values, a transfer operation by the correction value transmission controller 609 writes the correction values for one line. As for the correction values used by the offset correction unit 616, correction values in the part enclosed by the dotted line frame in FIG. 17A are used in focus detection for the left side in the screen. On the other hand, correction values in the part enclosed by the dashed and single-dotted line in FIG. 17A are used in focus detection for the right side in the screen. Although detailed description is omitted, the same configuration applies to a gain correction. The part corresponding to a readout region of the image signal A is selected for use from among correction values for one line stored in the gain correction value storage unit 617*a* (or, 617*b* or 617*c*).

As described above, in the present embodiment, the signal processor selects part of a plurality of correction values stored in a correction value storage unit to perform a correction. The signal processor changes the correction values used in a correction of a first signal (the luminance signal A) or a third signal (the luminance signal B) for each frame. The configuration of the present embodiment eliminates the need for the correction value transmission controller 609 to transmit different correction values depending on the readout region of the image signal A, thereby avoiding complication of the processing.

Each of the embodiments provides an image pickup apparatus, an image pickup system, a signal processing method, and a non-transitory computer-readable storage medium that are capable of highly accurately generating both an image pickup signal and a focus detection signal from an image pickup element with a small amount of correction data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, it is described that transfer of a correction value is performed for each frame, but may be performed only when the ISO sensitivity setting is changed. This configuration can reduce power consumption by the amount corresponding to a reduced number of transfer operations. The configuration is, however, not limited to when the ISO sensitivity setting is changed, and the transfer of correction values may be configured to be performed every time correction values are changed according to other shooting conditions such as stop setting and shutter speed setting.

Each of the embodiments describes a configuration in which an offset correction in is performed to correct an offset difference for each column, but is not limited to this configuration and a different offset correction may be configured to be performed for each pixel row. Similarly, a gain correction may be configured to be performed with multiplication by a different gain for each pixel row. Alternatively, the gain correction may be configured to be performed together with another gain correction such as an optical shading correction.

In each of the embodiments, a pixel addition is performed to add signals of colors R, G, and B with the same proportion, but the addition may be performed with a different weight for each color. Alternatively, signals may be configured to be added for the same color, whereas signals are not added for different colors.

Each of the embodiments describes a configuration of the number of addition pixels in which pixel addition is performed in 2×2, but is not limited to this configuration. As long as the amount of defocus can be highly accurately detected in the AF calculation, the addition may be performed in a larger unit.

Each of the embodiments describes a configuration of the arrangement of the sub pixels in which the sub pixels "a" and "b" are two divisions in the horizontal direction, but is not limited to this configuration. A configuration may be adopted in which one pixel corresponding to one micro lens is quarterly divided in 2×2. Alternatively, the division may be made with other numbers.

A configuration is described as a method of adding a signal of the sub pixel "a" and a signal of the sub pixel "b" in which the addition is performed at the FT unit 403, but the addition may be performed at other components of the image pickup element 106. The addition may be performed at a signal storage capacitor in a column common readout circuit. Alternatively, not being limited to being performed in the image pickup element 106, the addition may be configured to be performed at a DFE or a DSP after conversion to digital values.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-127788, filed on Jun. 18, 2013, which is hereby incorporated by reference herein in its entirety.

What is claimed is:

1. An image pickup apparatus comprising:
   an image pickup element including a plurality of pixels corresponding to a plurality of respective micro lenses, the image pickup element including a first photoelectric conversion portion and a second photoelectric conversion portion that are included in each of the pixels to share a corresponding one of the micro lenses; and
   a processor which corrects a first signal generated from a plurality of signals of the plurality of first photoelectric conversion portions and a third signal generated by subtracting the first signal from a second signal generated from a plurality of addition signals of the first photoelectric conversion portions and the second photoelectric conversion portions corresponding to the micro lenses,
   wherein the processor comprises:
   a storage memory which includes a first correction value storage memory and a second correction value storage memory to store a correction value used to correct the first signal, and
   a controller which transmits the correction value to the storage memory,
   wherein the processor is configured to uses the correction value stored in the first correction value storage memory to correct the first signal or the third signal for each frame, and
   the controller is configured to transmit the correction value to the second correction value storage memory.

2. The image pickup apparatus according to claim 1, wherein the first signal is a luminance signal.

3. The image pickup apparatus according to claim 1, wherein the first signal is a luminance signal generated from a plurality of signals from the first photoelectric conversion portions corresponding to a plurality of different colors.

4. The image pickup apparatus according to claim 1, wherein the first signal, the second signal, and the third signal are luminance signals.

5. The image pickup apparatus according to claim 1, wherein:
   the first signal is a luminance signal generated from a plurality of signals from the first photoelectric conversion portions corresponding to a plurality of different colors, and
   the third signal is a luminance signal generated from a plurality of signals from the second photoelectric conversion portions corresponding to a plurality of different colors.

6. The image pickup apparatus according to claim 1, wherein the processor is configured to:
   after correcting a plurality of addition signals of the first photoelectric conversion portions and the second photoelectric conversion portions corresponding to the micro lenses for each pixel, generate a second signal from the addition signals, and
   subtract the first signal corrected for the first photoelectric conversion portions from the second signal to generate a third signal.

7. The image pickup apparatus according to claim 6, wherein the processor is configured to correct the addition signal for each of the pixels and correct the first signal for the first photoelectric conversion portions in time division.

8. The image pickup apparatus according to claim 1, wherein the processor is configured to selectively use the correction value stored in one of the first correction value storage memory and the second correction value storage memory to correct the third signal for each frame.

9. The image pickup apparatus according to claim 1, wherein the processor is configured to select part of a plurality of correction values stored in the storage memory to perform a correction and is configured to change the correction value used to correct the first signal or the third signal for each frame.

10. The image pickup apparatus according to claim 1, further comprising a focus detector calculates an amount of focus shift of an object, wherein the focus detection unit is configured to perform focus detection based on the first signal and the third signal.

11. The image pickup apparatus according to claim 1, wherein the processor is configured to correct an addition signal of outputs from the first photoelectric conversion portion and the second photoelectric conversion portion included in each of the pixels, the addition signal being corrected for each of the pixels.

12. The image pickup apparatus according to claim 11, wherein the processor is configured to perform an offset correction on each of the addition signal and the first signal.

13. The image pickup apparatus according to claim 11, wherein the processor is configured to perform a gain correction on each of the addition signal and the first signal.

14. The image pickup apparatus according to claim 11, wherein the addition signal is used to generate a shot image.

15. A signal processing method of performing processing on a signal obtained from an image pickup element including a plurality of pixels corresponding to a plurality of respective micro lenses, the image pickup element including a first photoelectric conversion portion and a second photoelectric conversion portion that are included in each of the pixels to share a corresponding one of the micro lenses, the method comprising the steps of:

acquiring a plurality of signals of the first photoelectric conversion portions;

generating a first signal generated from the signals; and correcting the first signal and a third signal generated by subtracting the first signal from a second signal generated from a plurality of addition signals of the first photoelectric conversion portions and the second photoelectric conversion portions corresponding to the micro lenses, wherein a correction value used to correct the first signal is stored in a storage memory which includes a first correction value storage memory and a second correction value storage memory, the correction value is transmitted to the storage memory, and the correction value stored in the first correction value storage memory is used to correct the first signal or the third signal for each frame, and the correction value is transmitted to the second correction value storage memory.

16. An image pickup apparatus comprising:

an image pickup element including a plurality of pixels corresponding to a plurality of respective micro lenses, the image pickup element including a first photoelectric conversion portion and a second photoelectric conversion portion that are included in each of the pixels to share a corresponding one of the micro lenses; and a processor which corrects an addition signal of outputs from the first photoelectric conversion portion and the second photoelectric conversion portion included in each of the pixels and a first signal generated from a plurality of signals of the plurality of first photoelectric conversion portions corresponding to the micro lenses, wherein the processor comprises:

a storage memory which includes a first correction value storage memory and a second correction value storage memory to store a correction value used to correct the first signal, and a controller which transmits the correction value to the storage memory, wherein the processor is configured to correct the addition signal for each of the pixels, correct the first signal for the first photoelectric conversion portions and correct a third signal, which is generated by subtracting the first signal from a second signal generated from a plurality of addition signals of the first photoelectric conversion portions and the second photoelectric conversion portions corresponding to the micro lenses, for the second photoelectric conversion portions, wherein the processor is configured to selectively use the correction value stored in one of the first correction value storage memory and the second correction value storage memory to correct the first signal or the third signal for each frame.

17. An image pickup apparatus comprising:

an image pickup element including a plurality of pixels corresponding to a plurality of respective micro lenses, the image pickup element including a first photoelectric conversion portion and a second photoelectric conversion portion that are included in each of the pixels to share a corresponding one of the micro lenses; and a processor which corrects an addition signal of outputs from the first photoelectric conversion portion and the second photoelectric conversion portion included in each of the pixels and a first signal generated from a plurality of signals of the plurality of first photoelectric conversion portions corresponding to the micro lenses, wherein the processor comprises:

a storage memory which includes a first correction value storage memory and a second correction value storage memory to store a correction value used to correct the first signal, and a controller which transmits the correction value to the storage memory, wherein the processor is configured to correct the addition signal for each of the pixels, correct the first signal for the first photoelectric conversion portions, and correct a third signal, which is generated by subtracting the first signal from a second signal generated from a plurality of addition signals of the first photoelectric conversion portions and the second photoelectric conversion portions corresponding to the micro lenses, for the second photoelectric conversion portions, wherein the processor is configured to correct the first signal or the third signal using the correction value stored in the first correction value storage memory, and the controller is configured to transmit the correction value to the second correction value storage memory.

18. An image pickup apparatus comprising:

an image pickup element including a plurality of pixels corresponding to a plurality of respective micro lenses, the image pickup element including a first photoelectric conversion portion and a second photoelectric conversion portion that are included in each of the pixels to share a corresponding one of the micro lenses; and a processor which corrects an addition signal of outputs from the first photoelectric conversion portion and the second photoelectric conversion portion included in each of the pixels and a first signal generated from a plurality of signals of the plurality of first photoelectric conversion portions corresponding to the micro lenses, wherein the processor comprises:
a storage memory to store a correction value used to correct the first signal, and
a controller which transmits the correction value to the storage memory,
wherein the processor is configured to correct the addition signal for each of the pixels, correct the first signal for the first photoelectric conversion portions, and correct a third signal, which is generated by subtracting the first signal from a second signal generated from a plurality of addition signals of the first photoelectric conversion portions and the second photoelectric conversion portions corresponding to the micro lenses, for the second photoelectric conversion portions,
wherein the processor is configured to select part of a plurality of correction values stored in the storage memory to perform a correction and is configured to change the correction value used to correct the first signal or the third signal for each frame.

* * * * *